United States Patent
Chauhan

(10) Patent No.: US 11,531,929 B2
(45) Date of Patent: Dec. 20, 2022

(54) SYSTEMS AND METHODS FOR MACHINE GENERATED TRAINING AND IMITATION LEARNING

(71) Applicant: Citrix Systems, Inc., Fort Lauderdale, FL (US)

(72) Inventor: Abhishek Chauhan, Santa Clara, CA (US)

(73) Assignee: Citrix Sysiems, Inc., Fort Lauderdale, FL (US)

( * ) Notice: Subject to any disclaimer, the term of this patent is extended or adjusted under 35 U.S.C. 154(b) by 738 days.

(21) Appl. No.: 16/185,767

(22) Filed: Nov. 9, 2018

(65) Prior Publication Data

US 2020/0151617 A1 May 14, 2020

(51) Int. Cl.
*H04L 67/55* (2022.01)
*H04L 67/01* (2022.01)
*G06N 20/00* (2019.01)
*H04L 67/10* (2022.01)

(52) U.S. Cl.
CPC .............. *G06N 20/00* (2019.01); *H04L 67/55* (2022.05); *H04L 67/01* (2022.05); *H04L 67/10* (2013.01)

(58) Field of Classification Search
CPC ......... G06N 20/00; H04L 67/26; H04L 67/10; H04L 67/42
USPC .......................................................... 706/12
See application file for complete search history.

(56) References Cited

U.S. PATENT DOCUMENTS

| | | | | |
|---|---|---|---|---|
| 8,850,329 B1* | 9/2014 | Hill | ........................ | G06F 16/955 715/745 |
| 2011/0197124 A1* | 8/2011 | Garaventa | .............. | G06F 16/972 715/234 |
| 2013/0290318 A1* | 10/2013 | Shapira | .................. | G06F 16/248 707/723 |
| 2015/0005030 A1* | 1/2015 | Pennanen | ............... | G06N 20/00 455/556.1 |
| 2015/0007065 A1* | 1/2015 | Krishnamoorthy | | ......................... G06Q 30/0202 715/760 |
| 2015/0186798 A1* | 7/2015 | Vasseur | .................. | H04L 41/147 706/12 |
| 2017/0308595 A1* | 10/2017 | Dey | ........................ | G06F 16/283 |
| 2018/0181873 A1* | 6/2018 | Chen | .................. | G06F 16/90335 |
| 2018/0268344 A1* | 9/2018 | Bastide | .................. | G06Q 30/01 |
| 2019/0156247 A1* | 5/2019 | Faulhaber, Jr. | ......... | G06N 20/00 |
| 2019/0332946 A1* | 10/2019 | Han | .......................... | G06N 5/02 |
| 2020/0019420 A1* | 1/2020 | Saimani | .................... | G06N 5/04 |

* cited by examiner

*Primary Examiner* — Meng Vang
(74) *Attorney, Agent, or Firm* — Foley & Lardner LLP

(57) ABSTRACT

Embodiments described include systems and methods for generating training content for completion of tasks. The method includes receiving, from each of a plurality of client applications, interactions recorded by the client application via an embedded browser of the client application. The method includes classifying the interactions received from each client application into one or more tasks. The method includes selecting, for a first task of the one or more tasks, from the interactions classified into the first task, a subset of interactions to be included in a training content including a recorded example of performing the first task across the one or more network application. The method includes generating the training content configured to be transmitted to client applications responsive to receiving a request related to the first task.

19 Claims, 15 Drawing Sheets

SYSTEMS AND METHODS FOR MACHINE GENERATED TRAINING AND IMITATION LEARNING

FIELD OF DISCLOSURE

The present application generally relates to management of applications, including but not limited to systems and methods for using an embedded browser to generate and provide training content.

BACKGROUND

As the workforce of an enterprise becomes more mobile and work under various conditions, an individual can use one or more client devices, including personal devices, to access network resources such as web applications. Due to differences between the client devices and the manner in which network resources can be accessed, there are significant challenges to the enterprise in managing access to network resources and monitoring for potential misuse of resources. Moreover there is significant challenge in providing user training in the efficient use of resources.

BRIEF SUMMARY

In various embodiments, a machine may monitor user interactions with applications and may observe the interactions to learn to train less adapt users to interact with applications. For example, there is a spread between the most proficient users of an application/system, and the rest of users who may not yet be as proficient. An embedded browser (e.g., "a SaaS container") may watch and potentially record user interactions. By watching and potentially recording user interactions by proficient users of a network application, training may be created. For instance, for a given task within an application, a machine may take various actions. A machine may (i) classify user interactions into tasks, where each task might require multiple steps across multiple applications. The machine may (ii) identify a baseline for how long it takes to accomplish a task. This is a task distribution across the population of users that have attempted to complete the task. Note that the population of users may be across a subgroup in the enterprise, across the enterprise, or even across multiple enterprises (wisdom of the crowd) e.g. across the community of all users. The machine may (iii) identify the set of users that are more proficient. The machine may (iv) identify "best practices" as the things that are common across the efficient user set and/or select a representative user session from the proficient user set—as a training example. The machine may (v) sanitize the training example—removing sensitive information, identifiable information etc. The machine may (vi) identify a user session that is taking longer that baseline plus some deviation. The machine may (vii) offer the user of this session help. If they click on help—show them a recording of the training example. The machine may (viii) allow user to rate whether or not it was helpful. Finally, the machine may (ix) this feedback to pick superior samples from several training example.

Moreover, the machine may implement "imitation learning." For instance, as machine learning gets more advanced, the observing machine can be trained to not just pick a single user run as the training example, but rather generalize across multiples runs across multiple users, to synthetically create an "optimal" training example that can then be used to train/help the users attempting the task.

The machine may implement "optimized SaaS session recording." Since the network application sessions in the embedded browser ("SaaS sessions") are fundamentally rendered from higher order representations—HTTP and HTML requests and responses, rather than video screen recordings, it is possible to record and replay these sessions by recording and replaying the higher level representations of them. For instance, the machine may record http and html level session and interaction information (user input, key/mouse movement, timing, etc.) and/or track browser session and browser state. For example, the machine may record the output to the HTML DOM that is actually rendered by the browser. The output may, in various instances, be free from any JavaScript. This is in contrast to the "input" which may be JavaScript with calls and dependencies to internet services, etc. When replaying the content, executing JavaScript is avoided and instead the recorded DOM representations are re-rendered. Secure SaaS as the mediating browser into which the original session was rendered, is conveniently located at the right point of abstraction to be able to record these highly efficient representations of user interactions with the system. These representations are efficient both in terms of bytes required to store them; but also because they are more machine friendly, and therefore more amenable to analysis by machines—e.g. to look for specific behaviors across a large collection of recordings, or to use the records as subsequent input to machine learning algorithms.

The present disclosure is directed towards systems and methods of an embedded browser. A client application executing on a client device can allow a user to access applications (apps) that are served from and/or hosted on one or more servers, such as web applications and software-as-a-service (SaaS) applications (hereafter sometimes generally referred to as network applications). A browser that is embedded or integrated with the client application can render to the user a network application that is accessed or requested via the client application, and can enable interactivity between the user and the network application. The browser is sometimes referred to as an embedded browser, and the client application with embedded browser (CEB) is sometimes referred to as a workspace application. The client application can establish a secure connection to the one or more servers to provide an application session for the user to access the network application using the client device and the embedded browser. The embedded browser can be integrated with the client application to ensure that traffic related to the network application is routed through and/or processed in the client application, which can provide the client application with real-time visibility to the traffic (e.g., when decrypted through the client application), and user interactions and behavior. The embedded browser can provide a seamless experience to a user as the network application is requested via the user interface (shared by the client application and the embedded browser) and rendered through the embedded browser within the same user interface.

A method for generating training content for completion of tasks is described. The method may include receiving, by one or more first servers of a first entity, from each client application of a plurality of client applications executing on respective client devices, interactions recorded by the client application via an embedded browser of the client application. The method may also include classifying, by the one or more first servers, the interactions received from each client application into one or more tasks, each task of the one or more tasks including multiple interactions across one or more network applications of one or more second servers of a second entity. Additionally, the method may include selecting, by the one or more first servers, for a first task of the one or more tasks, from the interactions classified into the first task, a subset of interactions to be included in a training content including a recorded example of performing the first task across the one or more network application. Furthermore, the method may include generating, by the one or more first servers, the training content configured to be transmitted to client applications responsive to receiving a request related to the first task.

In various embodiments of the method, the embedded browser is integrated into the client application. At least one task of the one or more tasks is defined by a plurality of interactions across a plurality of network applications. The method may also contemplate identifying, by the one or more first servers, based on the received interactions, a baseline identifying an amount of time for completing the task. In certain embodiments, the method may include identifying, by the one or more first servers, based on the received interactions, a subset of users associated with the plurality of client applications, each user of the identified subset of users completing the task within a predetermined amount of time.

In some embodiments, one or more of the interactions identify a network application, a time stamp and an action performed by a user of the client application that recorded the interaction. Moreover, in some instances, the method includes removing content from the subset of interactions prior to transmitting the generated training content.

The training content package may be a first training content package. In connection with the training content package being the first training content package, the method may include receiving, by the one or more first servers, feedback relating to the first training content package; and generating, by the one or more first servers, a second generated content package responsive to determining that the feedback relating to the first training content package satisfies a predetermined threshold.

The method may include receiving, by the one or more first servers, an indication from a second client application executing on a second client device, that a user session is taking more time than a baseline amount of time to complete the first task, and transmitting, by the one or more first servers, the generated content package responsive to receiving the indication. The interactions recorded by the client applications may include an output to the Document Object Model rendered by the embedded browser. Finally, in various embodiments, the client application intercepts output representation of application layer protocol data of interactions of a user with the plurality of network applications, the output representation outputted to a document object model for rendering by the embedded browser.

In another aspect, this disclosure is directed to system for presenting additional content for a network application accessed via an embedded browser of a client application. The system may include one or more first servers of a first entity configured to perform at least the following. For example, the one or more first services of the first entity may be configured to receive, from each client application of a plurality of client applications executing on respective client devices, interactions recorded by the client application via an embedded browser of the client application. The one or more first services of the first entity may be configured to classify the interactions received from each client application into one or more tasks, each task of the one or more tasks including multiple interactions across one or more network applications of one or more second servers of a second entity. The one or more first services of the first entity may be configured to select, for a first task of the one or more tasks, from the interactions classified into the first task, a subset of interactions to be included in a training content comprising a recorded example of performing the first task across the one or more network application. The one or more first services of the first entity may be configured to generate the training content configured to be transmitted to client applications responsive to receiving a request related to the first task.

In some embodiments, the embedded browser is integrated into the client application. In some embodiments, at least one task of the one or more tasks is defined by a plurality of interactions across a plurality of network applications. Moreover, the one or more first servers may be further configured to identify, based on the received interactions, a baseline identifying an amount of time for completing the task. Additionally, one or more of the interactions may identify a network application, a time stamp and an action performed by a user of the client application that recorded the interaction.

In certain embodiments, the training content package is a first training content package, and the one or more first servers are further configured to receive feedback relating to the first training content package. The one or more first servers are also configured to generate a second generated content package responsive to determining that the feedback relating to the first training content package satisfies a predetermined threshold.

In yet another aspect, this disclosure is directed to a method for recording application level information of a user across a plurality of network applications. The method may include various aspects. For instance the method may include establishing, by a client application, one or more sessions of a user for a plurality of network applications established via an embedded browser within the client application. The method may include tracking, by the client application, user input and pointer movement of interactions by the user. The method may include intercepting, by the client application, output representation of application layer protocol data of interactions of the user with the plurality of network applications, the output representation outputted to a document object model for rendering by the embedded browser.

The method may include recording, by the one or more client application, the intercepted output representation and the tracked user input and pointer movement to record the one or more sessions of the user.

In some embodiments, the method also includes tracking, by the client application, a state of the one or more sessions and the embedded browser. Moreover, in various embodiments, the method further comprises intercepting, by the embedded browser, at a point between decryption of content from a network stack of a client device and rendering on the display of the client device.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 6 is an example representation of an implementation for browser redirection using a secure browser plug-in;

Figure 1:
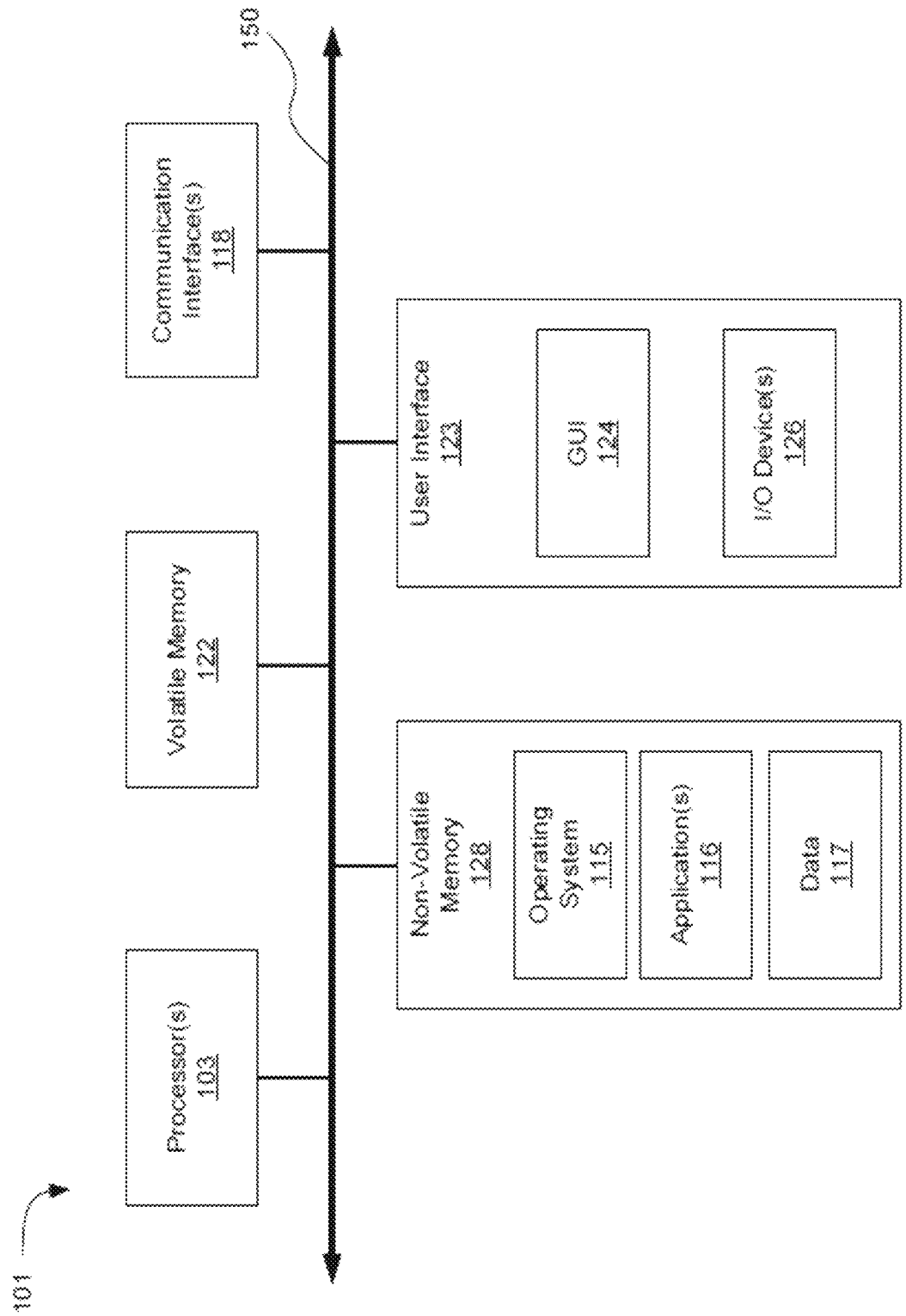
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein.

Section B describes systems and methods for an embedded browser.

Section C describes systems and methods for generating training content for completion of tasks and recording application level information of a user across a plurality of network applications.

A. Computing Environment

Prior to discussing the specifics of embodiments of the systems and methods detailed herein in Section B, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for an Embedded Browser

The present disclosure is directed towards systems and methods of an embedded browser. A client application executing on a client device can allow a user to access applications (apps) that are served from and/or hosted on one or more servers, such as web applications and software-as-a-service (SaaS) applications (hereafter sometimes generally referred to as network applications). A browser that is embedded or integrated with the client application can render to the user a network application that is accessed or requested via the client application, and can enable interactivity between the user and the network application. The browser is sometimes referred to as an embedded browser, and the client application with embedded browser (CEB) is sometimes referred to as a workspace application. The client application can establish a secure connection to the one or more servers to provide an application session for the user to access the network application using the client device and the embedded browser. The embedded browser can be integrated with the client application to ensure that traffic related to the network application is routed through and/or processed in the client application, which can provide the client application with real-time visibility to the traffic (e.g., when decrypted through the client application), and user interactions and behavior. The embedded browser can provide a seamless experience to a user as the network application is requested via the user interface (shared by the client application and the embedded browser) and rendered through the embedded browser within the same user interface.

The client application can terminate one end of a secured connection established with a server of a network application, such as a secure sockets layer (SSL) virtual private network (VPN) connection. The client application can receive encrypted traffic from the network application, and can decrypt the traffic before further processing (e.g., rendering by the embedded browser). The client application can monitor the received traffic (e.g., in encrypted packet form), and also have full visibility into the decrypted data stream and/or the SSL stack. This visibility can allow the client application to perform or facilitate policy-based management (e.g., including data loss prevention (DLP) capabilities), application control (e.g., to improve performance, service level), and collection and production of analytics. For instance, the local CEB can provide an information technology (IT) administrator with a controlled system for deploying web and SaaS applications through the CEB, and allow the IT administrator to set policies or configurations via the CEB for performing any of the forgoing activities.

Many web and SaaS delivered applications connect from web servers to generic browsers (e.g., Internet Explorer, Firefox, and so on) of users. Once authenticated, the entire session of such a network application is encrypted. However, in this scenario, an administrator may not have visibility, analytics, or control of the content entering the network application from the user's digital workspace, or the content leaving the network application and entering the user's digital workspace. Moreover, content of a network application viewed in a generic browser can be copied or downloaded (e.g., by a user or program) to potentially any arbitrary application or device, resulting in a possible breach in data security.

This present systems and methods can ensure that traffic associated with a network application is channeled through a CEB. By way of illustration, when a user accesses a SaaS web service with security assertion markup language (SAML) enabled for instance, the corresponding access request can be forwarded to a designated gateway service that determines, checks or verifies if the CEB was used to make the access request. Responsive to determining that a CEB was used to make the access request, the gateway service can perform or provide authentication and single-sign-on (SSO), and can allow the CEB to connect directly to the SaaS web service. Encryption (e.g., standard encryption) can be used for the application session between the CEB and the SaaS web service. When the content from the web service is unencrypted in the CEB to the viewed via the embedded browser, and/or when input is entered via the CEB, the CEB can provide added services on selective application-related information for control and analytics for instance. For example, an analytics agent or application programming interface (API) can be embedded in the CEB to provide or perform the added services.

The CEB (sometimes referred to as workspace application or receiver) can interoperate with one or more gateway services, intermediaries and/or network servers (sometimes collectively referred to as cloud services or Citrix Cloud) to provide access to a network application. Features and elements of an environment related to the operation of an embodiment of cloud services are described below.

Figure 2:
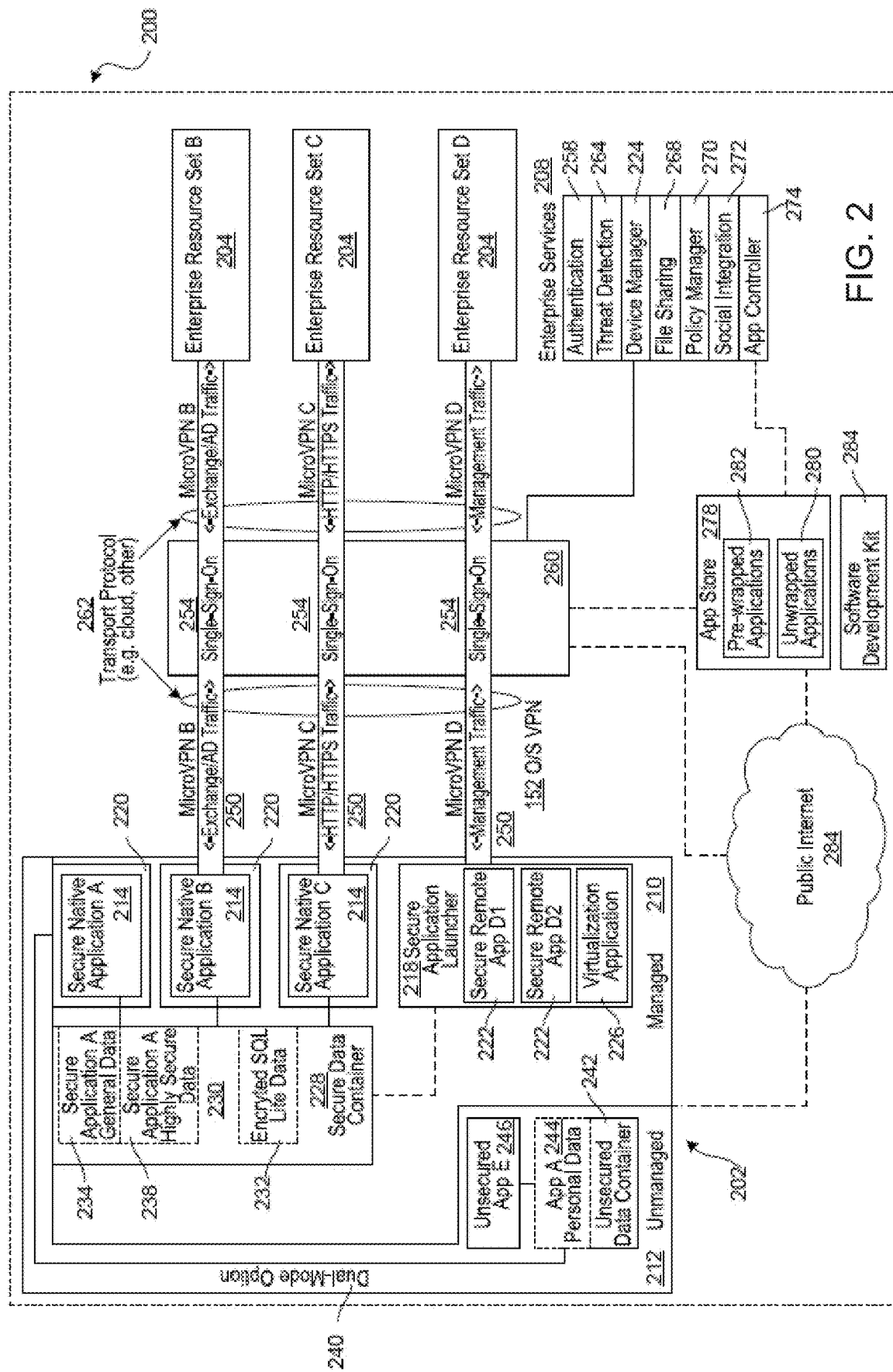
FIG. 2 is a block diagram of an illustrative embodiment of cloud services for use in accessing resources.

FIG. 2 illustrates an embodiment of cloud services for use in accessing resources including network applications. The cloud services can include an enterprise mobility technical architecture 200, which can include an access gateway 260 in one illustrative embodiment. The architecture can be used in a bring-your-own-device (BYOD) environment for instance. The architecture can enable a user of a client device 202 (e.g., a mobile or other device) to both access enterprise or personal resources from a client device 202, and use the client device 202 for personal use. The user may access such enterprise resources 204 or enterprise services 208 via a client application executing on the client device 202. The user may access such enterprise resources 204 or enterprise services 208 using a client device 202 that is purchased by the user or a client device 202 that is provided by the enterprise to user. The user may utilize the client device 202 for business use only or for business and personal use. The client device may run an iOS operating system, and Android operating system, or the like. The enterprise may choose to implement policies to manage the client device 202. The policies may be implanted through a firewall or gateway in such a way that the client device may be identified, secured or security verified, and provided selective or full access to the enterprise resources. The policies may be client device management policies, mobile application management policies, mobile data management policies, or some combination of client device, application, and data management policies. A client device 202 that is managed through the application of client device management policies may be referred to as an enrolled device. The client device management policies can be applied via the client application for instance.

In some embodiments, the operating system of the client device may be separated into a managed partition 210 and an unmanaged partition 212. The managed partition 210 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the client device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is not accessible by unmanaged apps and devices.

The secure applications may be email applications, web browsing applications, software-as-a-service (SaaS) access applications, Windows Application access applications, and the like. The client application can include a secure application launcher 218. The secure applications may be secure native applications 214, secure remote applications 222 executed by the secure application launcher 218, virtualization applications 226 executed by the secure application launcher 218, and the like. The secure native applications 214 may be wrapped by a secure application wrapper 220. The secure application wrapper 220 may include integrated policies that are executed on the client device 202 when the secure native application is executed on the device. The secure application wrapper 220 may include meta-data that points the secure native application 214 running on the client device 202 to the resources hosted at the enterprise that the secure native application 214 may require to complete the task requested upon execution of the secure native application 214. The secure remote applications 222 executed by a secure application launcher 218 may be executed within the secure application launcher application 218. The virtualization applications 226 executed by a secure application launcher 218 may utilize resources on the client device 202, at the enterprise resources 204, and the like. The resources used on the client device 202 by the virtualization applications 226 executed by a secure application launcher 218 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 204, and the like. The resources used at the enterprise resources 204 by the virtualization applications 226 executed by a secure application launcher 218 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application may use the user interaction data as an input to the application operating on the server. In this arrangement, an enterprise may elect to maintain the application on the server side as well as data, files, etc., associated with the application. While an enterprise may elect to "mobilize" some applications in accordance with the principles herein by securing them for deployment on the client device (e.g., via the client application), this arrangement may also be elected for certain applications. For example, while some applications may be secured for use on the client device, others might not be prepared or appropriate for deployment on the client device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the client device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the client device. The enterprise can use a client application, which can include a virtualization application, to allow access to applications that are deemed more properly operated on the server side. In an embodiment, the virtualization application may store some data, files, etc., on the mobile phone in one of the secure storage locations. An enterprise, for example, may elect to allow certain information to be stored on the phone while not permitting other information.

In connection with the virtualization application, as described herein, the client device may have a virtualization application that is designed to present GUIs and then record user interactions with the GUI. The virtualization application may communicate the user interactions to the server side to be used by the server side application as user interactions with the application. In response, the application on the server side may transmit back to the client device a new GUI. For example, the new GUI may be a static page, a dynamic page, an animation, or the like, thereby providing access to remotely located resources.

The secure applications may access data stored in a secure data container 228 in the managed partition 210 of the client device. The data secured in the secure data container may be accessed by the secure wrapped applications 214, applications executed by a secure application launcher 222, virtualization applications 226 executed by a secure application launcher 218, and the like. The data stored in the secure data container 228 may include files, databases, and the like. The data stored in the secure data container 228 may include data restricted to a specific secure application 230, shared among secure applications 232, and the like. Data restricted to a secure application may include secure general data 234 and highly secure data 238. Secure general data may use a strong form of encryption such as Advanced Encryption Standard (AES) 128-bit encryption or the like, while highly secure data 238 may use a very strong form of encryption such as AES 256-bit encryption. Data stored in the secure data container 228 may be deleted from the device upon receipt of a command from the device manager 224. The secure applications may have a dual-mode option 240. The dual mode option 240 may present the user with an option to operate the secured application in an unsecured or unmanaged mode. In an unsecured or unmanaged mode, the secure applications may access data stored in an unsecured data container 242 on the unmanaged partition 212 of the client device 202. The data stored in an unsecured data container may be personal data 244. The data stored in an unsecured data container 242 may also be accessed by unsecured applications 248 that are running on the unmanaged partition 212 of the client device 202. The data stored in an unsecured data container 242 may remain on the client device 202 when the data stored in the secure data container 228 is deleted from the client device 202. An enterprise may want to delete from the client device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The client device 202 may connect to enterprise resources 204 and enterprise services 208 at an enterprise, to the public Internet 248, and the like. The client device may connect to enterprise resources 204 and enterprise services 208 through virtual private network connections. The virtual private network connections, also referred to as microVPN or application-specific VPN, may be specific to particular applications (e.g., as illustrated by microVPNs 250), particular devices, particular secured areas on the client device (e.g., as illustrated by O/S VPN 252), and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 254. The single-sign-on processes may allow a user to provide a single set of authentication credentials, which are then verified by an authentication service 258. The authentication service 258 may then grant to the user access to multiple enterprise resources 204, without requiring the user to provide authentication credentials to each individual enterprise resource 204.

The virtual private network connections may be established and managed by an access gateway 260. The access gateway 260 may include performance enhancement features that manage, accelerate, and improve the delivery of enterprise resources 204 to the client device 202. The access gateway may also re-route traffic from the client device 202 to the public Internet 248, enabling the client device 202 to access publicly available and unsecured applications that run on the public Internet 248. The client device may connect to the access gateway via a transport network 262. The transport network 262 may use one or more transport protocols and may be a wired network, wireless network, cloud network, local area network, metropolitan area network, wide area network, public network, private network, and the like.

The enterprise resources 204 may include email servers, file sharing servers, SaaS/Web applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 204 may be premise-based resources, cloud based resources, and the like. The enterprise resources 204 may be accessed by the client device 202 directly or through the access gateway 260. The enterprise resources 204 may be accessed by the client device 202 via a transport network 262. The transport network 262 may be a wired network, wireless network, cloud network, local area network, metropolitan area network, wide area network, public network, private network, and the like.

Cloud services can include an access gateway 260 and/or enterprise services 208. The enterprise services 208 may include authentication services 258, threat detection services 264, device manager services 224, file sharing services 268, policy manager services 270, social integration services 272, application controller services 274, and the like. Authentication services 258 may include user authentication services, device authentication services, application authentication services, data authentication services and the like. Authentication services 258 may use certificates. The certificates may be stored on the client device 202, by the enterprise resources 204, and the like. The certificates stored on the client device 202 may be stored in an encrypted location on the client device, the certificate may be temporarily stored on the client device 202 for use at the time of authentication, and the like. Threat detection services 264 may include intrusion detection services, unauthorized access attempt detection services, and the like. Unauthorized access attempt detection services may include unauthorized attempts to access devices, applications, data, and the like. Device management services 224 may include configuration, provisioning, security, support, monitoring, reporting, and decommissioning services. File sharing services 268 may include file management services, file storage services, file collaboration services, and the like. Policy manager services 270 may include device policy manager services, application policy manager services, data policy manager services, and the like. Social integration services 272 may include contact integration services, collaboration services, integration with social networks such as Facebook, Twitter, and LinkedIn, and the like. Application controller services 274 may include management services, provisioning services, deployment services, assignment services, revocation services, wrapping services, and the like.

The enterprise mobility technical architecture 200 may include an application store 278. The application store 278 may include unwrapped applications 280, pre-wrapped applications 282, and the like. Applications may be populated in the application store 278 from the application controller 274. The application store 278 may be accessed by the client device 202 through the access gateway 260, through the public Internet 248, or the like. The application store may be provided with an intuitive and easy to use User Interface.

A software development kit 284 may provide a user the capability to secure applications selected by the user by providing a secure wrapper around the application. An application that has been wrapped using the software development kit 284 may then be made available to the client device 202 by populating it in the application store 278 using the application controller 274.

The enterprise mobility technical architecture 200 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 3:
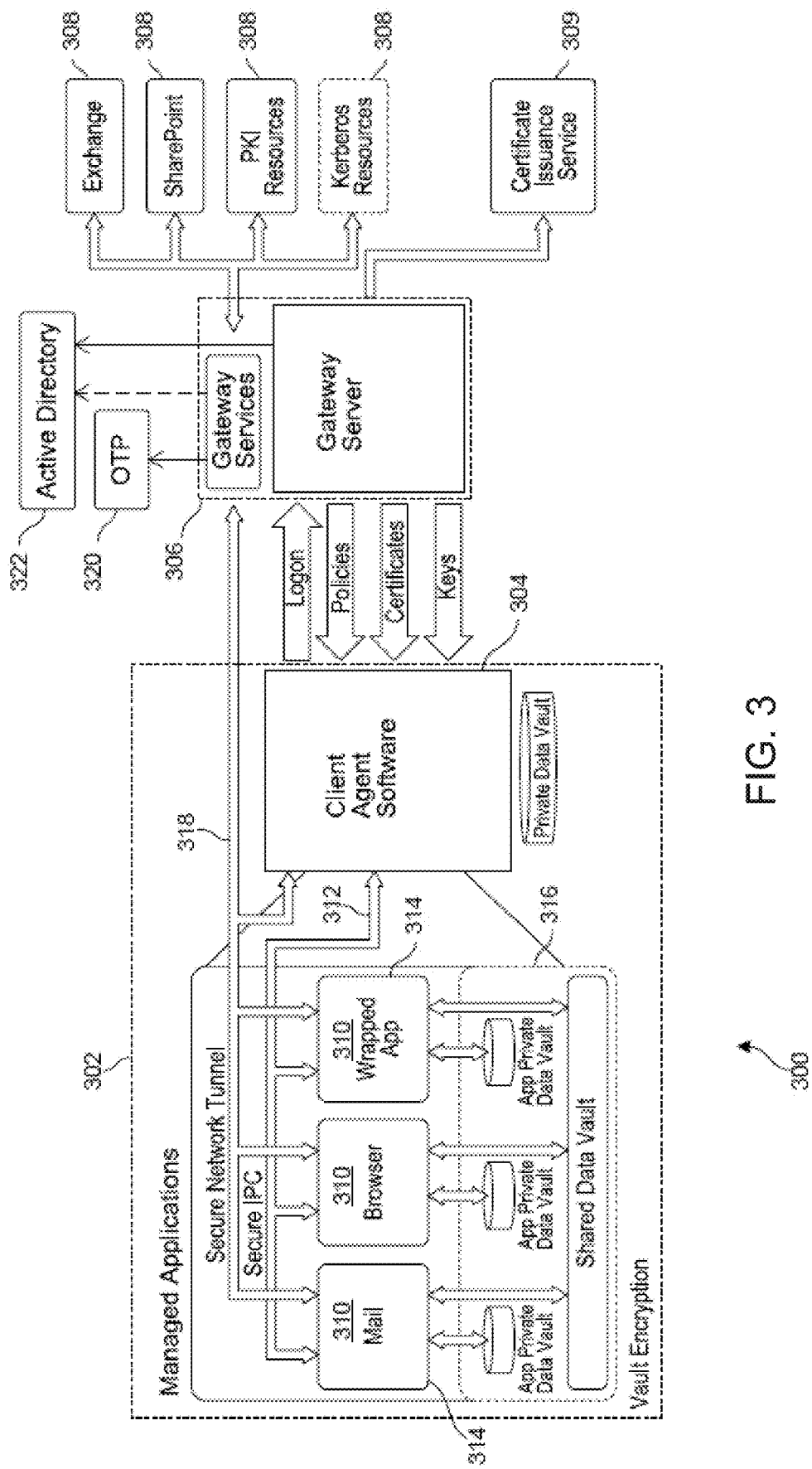
FIG. 3 is a block diagram of an example embodiment of an enterprise mobility management system.

FIG. 3 depicts is an illustrative embodiment of an enterprise mobility management system 300. Some of the components of the mobility management system 200 described above with reference to FIG. 2 have been omitted for the sake of simplicity. The architecture of the system 300 depicted in FIG. 3 is similar in many respects to the architecture of the system 200 described above with reference to FIG. 2 and may include additional features not mentioned above.

In this case, the left hand side represents an enrolled client device 302 with a client agent 304, which interacts with gateway server 306 to access various enterprise resources 308 and services 309 such as Web or SaaS applications, Exchange, Sharepoint, public-key infrastructure (PKI) Resources, Kerberos Resources, Certificate Issuance service, as shown on the right hand side above. The gateway server 306 can include embodiments of features and functionalities of the cloud services, such as access gateway 260 and application controller functionality. Although not specifically shown, the client agent 304 may be part of, and/or interact with the client application which can operate as an enterprise application store (storefront) for the selection and/or downloading of network applications.

The client agent 304 can act as a UI (user interface) intermediary for Windows apps/desktops hosted in an Enterprise data center, which are accessed using the High-Definition User Experience (HDX) or Independent Computing Architecture (ICA) display remoting protocol. The client agent 304 can also support the installation and management of native applications on the client device 302, such as native iOS or Android applications. For example, the managed applications 310 (mail, browser, wrapped application) shown in the figure above are native applications that execute locally on the device. Client agent 304 and application management framework of this architecture act to provide policy driven management capabilities and features such as connectivity and SSO (single sign on) to enterprise resources/services 308. The client agent 304 handles primary user authentication to the enterprise, for instance to access gateway (AG) with SSO to other gateway server components. The client agent 304 obtains policies from gateway server 306 to control the behavior of the managed applications 310 on the client device 302.

The Secure interprocess communication (IPC) links 312 between the native applications 310 and client agent 304 represent a management channel, which allows client agent to supply policies to be enforced by the application management framework 314 "wrapping" each application. The IPC channel 312 also allows client agent 304 to supply credential and authentication information that enables connectivity and SSO to enterprise resources 308. Finally the IPC channel 312 allows the application management framework 314 to invoke user interface functions implemented by client agent 304, such as online and offline authentication.

Communications between the client agent 304 and gateway server 306 are essentially an extension of the management channel from the application management framework 314 wrapping each native managed application 310. The application management framework 314 requests policy information from client agent 304, which in turn requests it from gateway server 306. The application management framework 314 requests authentication, and client agent 304 logs into the gateway services part of gateway server 306 (also known as NetScaler access gateway). Client agent 304 may also call supporting services on gateway server 306, which may produce input material to derive encryption keys for the local data vaults 316, or provide client certificates which may enable direct authentication to PKI protected resources, as more fully explained below.

In more detail, the application management framework 314 "wraps" each managed application 310. This may be incorporated via an explicit build step, or via a post-build processing step. The application management framework 314 may "pair" with client agent 304 on first launch of an application 310 to initialize the Secure IPC channel and obtain the policy for that application. The application management framework 314 may enforce relevant portions of the policy that apply locally, such as the client agent login dependencies and some of the containment policies that restrict how local OS services may be used, or how they may interact with the application 310.

The application management framework 314 may use services provided by client agent 304 over the Secure IPC channel 312 to facilitate authentication and internal network access.

Key management for the private and shared data vaults 316 (containers) may be also managed by appropriate interactions between the managed applications 310 and client agent 304. Vaults 316 may be available only after online authentication, or may be made available after offline authentication if allowed by policy. First use of vaults 316 may require online authentication, and offline access may be limited to at most the policy refresh period before online authentication is again required.

Network access to internal resources may occur directly from individual managed applications 310 through access gateway 306. The application management framework 314 is responsible for orchestrating the network access on behalf of each application 310. Client agent 304 may facilitate these network connections by providing suitable time limited secondary credentials obtained following online authentication. Multiple modes of network connection may be used, such as reverse web proxy connections and end-to-end VPN-style tunnels 318.

The Mail and Browser managed applications 310 can have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture can support the incorporation of various other security features. For example, gateway server 306 (including its gateway services) in some cases might not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 306 may identify managed native applications 310 that are allowed to have access to more sensitive data using strong authentication, and ensure that access to these applications is only permitted after performing appropriate authentication, even if this means a re-authentication is requested from the user after a prior weaker level of login.

Another security feature of this solution is the encryption of the data vaults 316 (containers) on the client device 302. The vaults 316 may be encrypted so that all on-device data including clipboard/cache data, files, databases, and configurations are protected. For on-line vaults, the keys may be stored on the server (gateway server 306), and for off-line vaults, a local copy of the keys may be protected by a user password or biometric validation. When data is stored locally on the device 302 in the secure container 316, it is preferred that a minimum of AES 256 encryption algorithm be utilized.

Other secure container features may also be implemented. For example, a logging feature may be included, wherein all security events happening inside an application 310 are logged and reported to the backend. Data wiping may be supported, such as if the application 310 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector might cause multiple copies of the same encrypted data to yield different cipher text output, preventing both replay and cryptanalytic attacks. This may also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented via the CEB, wherein after a policy-defined period of inactivity, a user session is terminated.

Data leakage from the application management framework 314 may be prevented in other ways. For example, when an application 310 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 320 without the use of an AD (active directory) 322 password for access to one or more applications. In some cases, some users do not know (or are not permitted to know) their AD password, so these users may authenticate using an OTP 320 such as by using a hardware OTP system like SecurID (OTPs may be provided by different vendors also, such as Entrust or Gemalto). In some cases, after a user authenticates with a user ID, a text is sent to the user with an OTP 320. In some cases, this may be implemented only for online use, with a prompt being a single field.

An offline password may be implemented for offline authentication for those applications 310 for which offline use is permitted via enterprise policy. For example, an enterprise may want storefront to be accessed in this manner. In this case, the client agent 304 may require the user to set a custom offline password and the AD password is not used. Gateway server 306 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 310 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 304 may be retrieved by gateway server 306 and used in a keychain. Each managed application may have one associated client certificate, identified by a label that is defined in gateway server 306.

Gateway server 306 may interact with an Enterprise special purpose web service to support the issuance of client certificates to allow relevant managed applications to authenticate to internal PKI protected resources.

The client agent 304 and the application management framework 314 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate might never be present in the iOS keychain and might not be persisted except potentially in "online-only" data value that is strongly protected.

Mutual SSL or TLS may also be implemented to provide additional security by requiring that a client device 302 is authenticated to the enterprise, and vice versa. Virtual smart cards for authentication to gateway server 306 may also be implemented.

Both limited and full Kerberos support may be additional features. The full support feature relates to an ability to do full Kerberos login to Active Directory (AD) 322, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 310 is not running.

A multi-site architecture or configuration of enterprise application store and an application controller may be supported that allows users to be service from one of several different locations in case of failure.

In some cases, managed applications 310 may be allowed to access a certificate and private key via an API (example OpenSSL). Trusted managed applications 310 of an enterprise may be allowed to perform specific Public Key operations with an application's client certificate and private key. Various use cases may be identified and treated accordingly, such as when an application behaves like a browser and no certificate access is used, when an application reads a certificate for "who am I," when an application uses the certificate to build a secure session token, and when an application uses private keys for digital signing of important data (e.g., transaction log) or for temporary data encryption.

Figure 4:
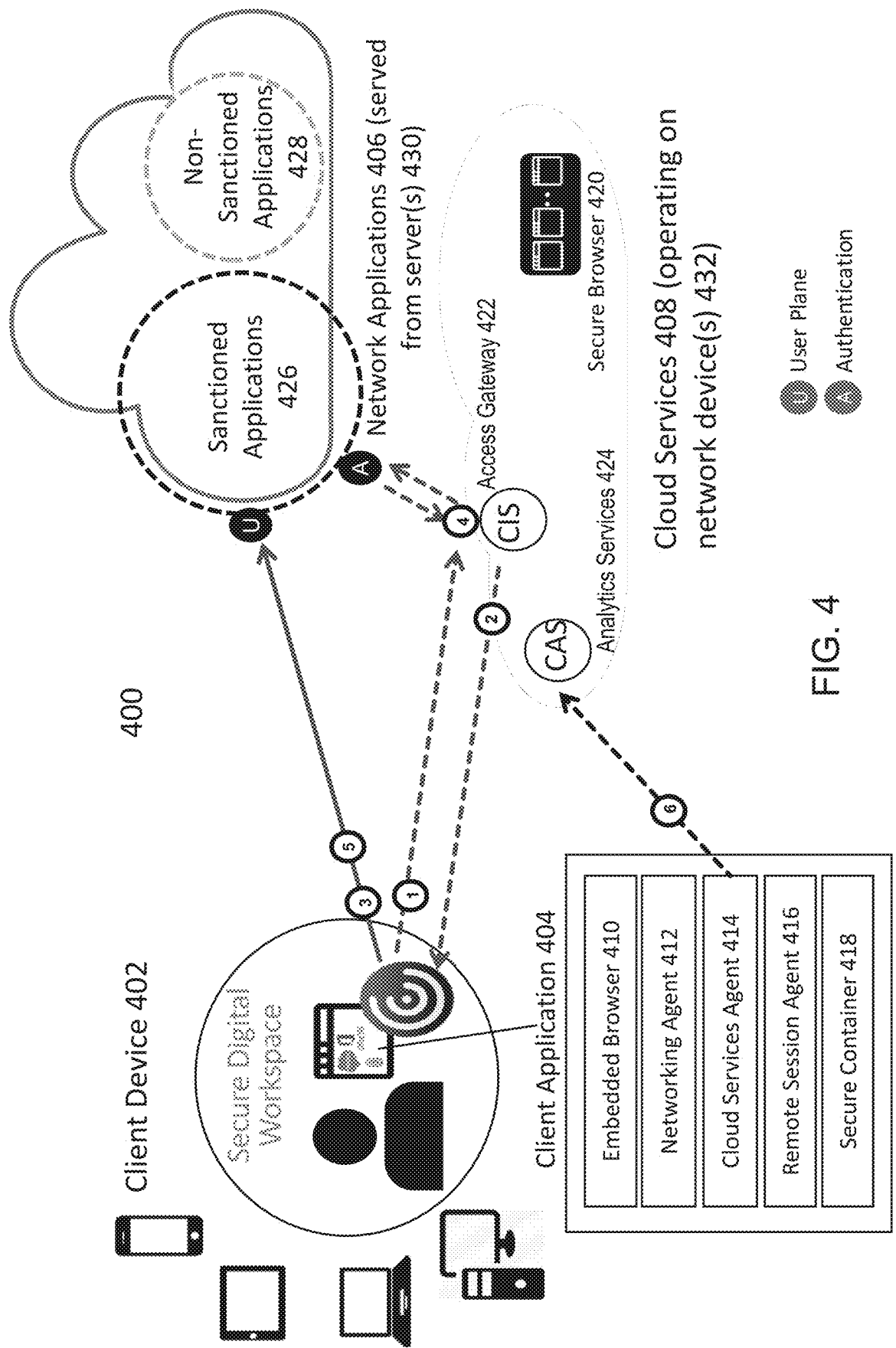
FIG. 4 is a block diagram of a system 400 of an embedded browser.

Referring now to FIG. 4, depicted is a block diagram of a system 400 of an embedded browser. In brief overview, the system 400 may include a client device 402 with a digital workspace for a user, a client application 404, cloud services 408 operating on at least one network device 432, and network applications 406 served from and/or hosted on one or more servers 430. The client application 404 can for instance include at least one of: an embedded browser 410, a networking agent 412, a cloud services agent 414, a remote session agent 416, or a secure container 418. The cloud services 408 can for instance include at least one of: secure browser(s) 420, an access gateway 422 (or CIS, e.g., for registering and/or authenticating the client application and/or user), or analytics services 424 (or CAS, e.g., for receiving information from the client application for analytics). The network applications 406 can include sanctioned applications 426 and non-sanctioned applications 428.

Each of the above-mentioned elements or entities is implemented in hardware, or a combination of hardware and software, in one or more embodiments. Each component of the system 400 may be implemented using hardware or a combination of hardware or software detailed above in connection with FIG. 1. For instance, each of these elements or entities can include any application, program, library, script, task, service, process or any type and form of executable instructions executing on hardware of the client device 402, the at least one network device 432 and/or the one or more servers 430. The hardware includes circuitry such as one or more processors in one or more embodiments. For example, the at least one network device 432 and/or the one or more servers 430 can include any of the elements of a computing device described above in connection with at least FIG. 1 for instance.

The client device 402 can include any embodiment of a computing device described above in connection with at least FIG. 1 for instance. The client device 402 can include any user device such as a desktop computer, a laptop computer, a tablet device, a smart phone, or any other mobile or personal device. The client device 402 can include a digital workspace of a user, which can include file system(s), cache or memory (e.g., including electronic clipboard(s)), container(s), application(s) and/or other resources on the client device 402. The digital workspace can include or extend to one or more networks accessible by the client device 402, such as an intranet and the Internet, including file system(s) and/or other resources accessible via the one or more networks. A portion of the digital workspace can be secured via the use of the client application 404 with embedded browser 410 (CEB) for instance. The secure portion of the digital workspace can include for instance file system(s), cache or memory (e.g., including electronic clipboard(s)), application(s), container(s) and/or other resources allocated to the CEB, and/or allocated by the CEB to network application(s) 406 accessed via the CEB. The secure portion of the digital workspace can also include resources specified by the CEB (via one or more policies) for inclusion in the secure portion of the digital workspace (e.g., a particular local application can be specified via a policy to be allowed to receive data obtained from a network application).

The client application 404 can include one or more components, such as an embedded browser 410, a networking agent 412, a cloud services agent 414 (sometimes referred to as management agent), a remote session agent 416 (sometimes referred to as HDX engine), and/or a secure container 418 (sometimes referred to as secure cache container). One or more of the components can be installed as part of a software build or release of the client application 404 or CEB, or separately acquired or downloaded and installed/integrated into an existing installation of the client application 404 or CEB for instance. For instance, the client device may download or otherwise receive the client application 404 (or any component) from the network device(s) 432. In some embodiments, the client device may send a request for the client application 404 to the network device(s) 432. For example, a user of the client device can initiate a request, download and/or installation of the client application. The network device(s) 432 in turn may send the client application to the client device. In some embodiments, the network device(s) 432 may send a setup or installation application for the client application to the client device. Upon receipt, the client device may install the client application onto a hard disk of the client device. In some embodiments, the client device may run the setup application to unpack or decompress a package of the client application. In some embodiments, the client application may be an extension (e.g., an add-on, an add-in, an applet or a plug-in) to another application (e.g., a networking agent 412) installed on the client device. The client device may install the client application to interface or inter-operate with the pre-installed application. In some embodiments, the client application may be a standalone application. The client device may install the client application to execute as a separate process.

The embedded browser 410 can include elements and functionalities of a web browser application or engine. The embedded browser 410 can locally render network application(s) as a component or extension of the client application. For instance, the embedded browser 410 can render a SaaS/Web application inside the CEB which can provide the CEB with full visibility and control of the application session. The embedded browser can be embedded or incorporated into the client application via any means, such as direct integration (e.g., programming language or script insertion) into the executable code of the client application, or via plugin installation. For example, the embedded browser can include a Chromium based browser engine or other type of browser engine, that can be embedded into the client application, using the Chromium embedded framework (CEF) for instance. The embedded browser can include a HTML5-based layout graphical user interface (GUI). The embedded browser can provide HTML rendering and JavaScript support to a client application incorporating various programming languages. For example, elements of the embedded browser can bind to a client application incorporating C, C++, Delphi, Go, Java, .NET/Mono, Visual Basic 6.0, and/or Python.

In some embodiments, the embedded browser comprises a plug-in installed on the client application. For example, the plug-in can include one or more components. One such components can be an ActiveX control or Java control or any other type and/or form of executable instructions capable of loading into and executing in the client application. For example, the client application can load and run an Active X control of the embedded browser, such as in a memory space or context of the client application. In some embodiments, the embedded browser can be installed as an extension on the client application, and a user can choose to enable or disable the plugin or extension. The embedded browser (e.g., via the plugin or extension) can form or operate as a secured browser for securing, using and/or accessing resources within the secured portion of the digital workspace.

The embedded browser can incorporate code and functionalities beyond that available or possible in a standard or typical browser. For instance, the embedded browser can bind with or be assigned with a secured container 418, to define at least part of the secured portion of a user's digital workspace. The embedded browser can bind with or be assigned with a portion of the client device's cache to form a secured clipboard (e.g., local to the client device, or extendable to other devices), that can be at least part of the secured container 418. The embedded browser can be integrated with the client application to ensure that traffic related to network applications is routed through and/or processed in the client application, which can provide the client application with real-time visibility to the traffic (e.g., when decrypted through the client application). This visibility to the traffic can allow the client application to perform or facilitate policy-based management (e.g., including data loss prevention (DLP) capabilities), application control, and collection and production of analytics.

In some embodiments, the embedded browser incorporates one or more other components of the client application 404, such as the cloud services agent 414, remote session agent 416 and/or secure container 418. For instance, a user can use the cloud services agent 414 of the embedded browser to interoperate with the access gateway 422 (sometimes referred to as CIS) to access a network application. For example, the cloud services agent 414 can execute within the embedded browser, and can receive and transmit navigation commands from the embedded browser to a hosted network application. The cloud services agent can use a remote presentation protocol to display the output generated by the network application to the embedded browser. For example, the cloud services agent 414 can include a HTML5 web client that allows end users to access remote desktops and/or applications on the embedded browser.

The client application 404 and CEB operate on the application layer of the operational (OSI) stack of the client device. The client application 404 can include and/or execute one or more agents that interoperate with the cloud services 408. The client application 404 can receive, obtain, retrieve or otherwise access various policies (e.g., an enterprise's custom, specified or internal policies or rules) and/or data (e.g., from an access gateway 422 and/or network device(s) of cloud services 408, or other server(s), that may be managed by the enterprise). The client application can access the policies and/or data to control and/or manage a network application (e.g., a SaaS, web or remote-hosted application). Control and/or management of a network application can include control and/or management of various aspects of the network application, such as access control, session delivery, available features or functions, service level, traffic management and monitoring, and so on. The network application can be from a provider or vendor of the enterprise (e.g., salesforce.com, SAP, Microsoft Office 365), from the enterprise itself, or from another entity (e.g., Dropbox or Gmail service).

For example, the cloud services agent 414 can provide policy driven management capabilities and features related to the use and/or access of network applications. For example, the cloud services agent 414 can include a policy engine to apply one or more policies (e.g., received from cloud services) to determine access control and/or connectivity to resources such as network applications. When a session is established between the client application and a server 430 providing a SaaS application for instance, the cloud services agent 414 can apply one or more policies to control traffic levels and/or traffic types (or other aspects) of the session, for instance to manage a service level of the SaaS application. Additional aspects of the application traffic that can be controlled or managed can include encryption level and/or encryption type applied to the traffic, level of interactivity allowed for a user, limited access to certain features of the network application (e.g., print-screen, save, edit or copy functions), restrictions to use or transfer of data obtained from the network application, limit concurrent access to two or more network applications, limit access to certain file repositories or other resources, and so on.

The cloud services agent 414 can convey or feed information to analytics services 424 of the cloud services 408, such as information about SaaS interaction events visible to the CEB. Such a configuration using the CEB can monitor or capture information for analytics without having an inline device or proxy located between the client device and the server(s) 430, or using a SaaS API gateway 'out-of-band' approach. In some embodiments, the cloud services agent 414 does not execute within the embedded browser. In these embodiments, a user can similarly use the cloud services agent 414 to interoperate with the access gateway (or CIS) 422 to access a network application. For instance, the cloud services agent 414 can register and/or authenticate with the access gateway (or CIS) 422, and can obtain a list of the network applications from the access gateway (or CIS) 422. The cloud services agent 414 can include and/or operate as an application store (or storefront) for user selection and/or downloading of network applications. Upon logging in to access a network application, the cloud services agent 414 can intercept and transmit navigation commands from the embedded browser to the network application. The cloud services agent can use a remote presentation protocol to display the output generated by the network application to the embedded browser. For example, the cloud services agent 414 can include a HTML5 web client that allows end users to access remote desktops and/or applications on the embedded browser.

In some embodiments, the cloud services agent 414 provides single sign on (SSO) capability for the user and/or client device to access a plurality of network applications. The cloud services agent 414 can perform user authentication to access network applications as well as other network resources and services, by communicating with the access gateway 422 for instance. For example, the cloud services agent 414 can authenticate or register with the access gateway 422, to access other components of the cloud services 408 and/or the network applications 406. Responsive to the authentication or registration, the access gateway 422 can perform authentication and/or SSO for (or on behalf of) the user and/or client application, with the network applications.

The client application 404 can include a networking agent 412. The networking agent 412 is sometimes referred to as a software-defined wide area network (SD-WAN) agent, mVPN agent, or microVPN agent. The networking agent 412 can establish or facilitate establishment of a network connection between the client application and one or more resources (e.g., server 430 serving a network application). The networking agent 412 can perform handshaking for a requested connection from the client application to access a network application, and can establish the requested connection (e.g., secure or encrypted connection). The networking agent 412 can connect to enterprise resources (including services) for instance via a virtual private network (VPN). For example, the networking agent 412 can establish a secure socket layer (SSL) VPN between the client application and a server 430 providing the network application 406. The VPN connections, sometimes referred to as microVPN or application-specific VPN, may be specific to particular network applications, particular devices, particular secured areas on the client device, and the like, for instance as discussed above in connection with FIG. 3. Such VPN connections can carry Microsoft Exchange traffic, Microsoft Active Directory traffic, HyperText Transfer Protocol (HTTP) traffic, HyperText Transfer Protocol Secure (HTTPS) traffic, as some examples.

The remote session agent 416 (sometimes referred to as HDX engine) can include features of the client agent 304 discussed above in connection with FIG. 2 for instance, to support display a remoting protocol (e.g., HDX or ICA). In some embodiments, the remote session agent 416 can establish a remote desktop session and/or remote application session in accordance to any variety of protocols, such as the Remote Desktop Protocol (RDP), Appliance Link Protocol (ALP), Remote Frame Buffer (RFB) Protocol, and ICA Protocol. For example, the remote session agent 416 can establish a remote application session for a user of the client device to access an enterprise network application. The remote session agent 416 can establish the remote application session within or over a secure connection (e.g., a VPN) established by the networking agent 412 for instance.

The client application or CEB can include or be associated with a secure container 418. A secure container can include a logical or virtual delineation of one or more types of resources accessible within the client device and/or accessible by the client device. For example, the secure container 418 can refer to the entirety of the secured portion of the digital workspace, or particular aspect(s) of the secured portion. In some embodiments, the secure container 418 corresponds to a secure cache (e.g., electronic or virtual clipboard), and can dynamically incorporate a portion of a local cache of each client device of a user, and/or a cloud-based cache of the user, that is protected or secured (e.g., encrypted). The secure container can define a portion of file system(s), and/or delineate resources allocated to a CEB and/or to network applications accessed via the CEB. The secure container can include elements of the secure data container 228 discussed above in connection with FIG. 2 for example. The CEB can be configured (e.g., via policies) to limit, disallow or disable certain actions or activities on resources and/or data identified to be within a secure container. A secured container can be defined to specify that the resources and/or data within the secure container are to be monitored for misuse, abuse and/or exfiltration.

In certain embodiments, a secure container relates to or involves the use of a secure browser (e.g., embedded browser 410 or secure browser 420) that implements various enterprise security features. Network applications (or web pages accessed by the secure browser) that are configured to run within the secure browser can effectively inherit the security mechanisms implemented by the secure browser. These network applications can be considered to be contained within the secure container. The use of such a secure browser can enable an enterprise to implement a content filtering policy in which, for example, employees are blocked from accessing certain web sites from their client devices. The secure browser can be used, for example, to enable client device users to access a corporate intranet without the need for a VPN.

In some embodiments, a secure container can support various types of remedial actions for protecting enterprise resources. One such remedy is to lock the client device, or a secure container on the client device that stores data to be protected, such that the client device or secure container can only be unlocked with a valid code provided by an administrator for instance. In some embodiments, these and other types of remedies can be invoked automatically based on conditions detected on the client device (via the application of policies for instance), or can be remotely initiated by an administrator.

In some embodiments, a secure container can include a secure document container for documents. A document can comprise any computer-readable file including text, audio, video, and/or other types of information or media. A document can comprise any single one or combination of these media types. As explained herein, the secure container can help prevent the spread of enterprise information to different applications and components of the client device, as well as to other devices. The enterprise system (which can be partially or entirely within a cloud network) can transmit documents to various devices, which can be stored within the secure container. The secure container can prevent unauthorized applications and other components of the client device from accessing information within the secure container. For enterprises that allow users to use their own client devices for accessing, storing, and using enterprise data, providing secure container on the client devices helps to secure the enterprise data. For instance, providing secure containers on the client devices can centralize enterprise data in one location on each client device, and can facilitate selective or complete deletion of enterprise data from each client device when desired.

The secure container can include an application that implements a file system that stores documents and/or other types of files. The file system can comprise a portion of a computer-readable memory of the client device. The file system can be logically separated from other portions of the computer-readable memory of the client device. In this way, enterprise data can be stored in a secure container and private data can be stored in a separate portion of the computer-readable memory of the client device for instance. The secure container can allow the CEB, network applications accessed via the CEB, locally installed applications and/or other components of the client device to read from, write to, and/or delete information from the file system (if authorized to do so). Deleting data from the secure container can include deleting actual data stored in the secure container, deleting pointers to data stored in the secure container, deleting encryption keys used to decrypt data stored in the secure container, and the like. The secure container can be installed by, e.g., the client application, an administrator, or the client device manufacturer. The secure container can enable some or all of the enterprise data stored in the file system to be deleted without modifying private data stored on the client device outside of the secure container. The file system can facilitate selective or complete deletion of data from the file system. For example, an authorized component of the enterprise's system can delete data from the file system based on, e.g., encoded rules. In some embodiments, the client application can delete the data from the file system, in response to receiving a deletion command from the enterprise's system.

The secure container can include an access manager that governs access to the file system by applications and other components of the client device. Access to the file system can be governed based on document access policies (e.g., encoded rules) maintained by the client application, in the documents and/or in the file system. A document access policy can limit access to the file system based on (1) which application or other component of the client device is requesting access, (2) which documents are being requested, (3) time or date, (4) geographical position of the client device, (5) whether the requesting application or other component provides a correct certificate or credentials, (6) whether the user of the client device provides correct credentials, (7) other conditions, or any combination thereof. A user's credentials can comprise, for example, a password, one or more answers to security questions (e.g., What is the mascot of your high school?), biometric information (e.g., fingerprint scan, eye-scan), and the like. Hence, by using the access manager, the secure container can be configured to be accessed only by applications that are authorized to access the secure container. As one example, the access manager can enable enterprise applications installed on the client device to access data stored in the secure container and to prevent non-enterprise applications from accessing the data stored in the secure container.

Temporal and geographic restrictions on document access may be useful. For example, an administrator may deploy a document access policy that restricts the availability of the documents (stored within the secure container) to a specified time window and/or a geographic zone (e.g., as determined by a GPS chip) within which the client device must reside in order to access the documents. Further, the document access policy can instruct the secure container or client application to delete the documents from the secure container or otherwise make them unavailable when the specified time period expires or if the client device is taken outside of the defined geographic zone.

Some documents can have access policies that forbid the document from being saved within the secure container. In such embodiments, the document can be available for viewing on the client device only when the user is logged in or authenticated via the cloud services for example.

The access manager can also be configured to enforce certain modes of connectivity between remote devices (e.g., an enterprise resource or other enterprise server) and the secure container. For example, the access manager can require that documents received by the secure container from a remote device and/or sent from the secure container to the remote device be transmitted through secured tunnels/connections, for example. The access manager can require that all documents transmitted to and from the secure container be encrypted. The client application or access manager can be configured to encrypt documents sent from the secure container and decrypt documents sent to the secure container. Documents in the secure container can also be stored in an encrypted form.

The secure container can be configured to prevent documents or data included within documents or the secure container from being used by unauthorized applications or components of the client device or other devices. For instance, a client device application having authorization to access documents from the secure container can be programmed to prevent a user from copying a document's data and pasting it into another file or application interface, or locally saving the document or document data as a new file outside of the secure container. Similarly, the secure container can include a document viewer and/or editor that do not permit such copy/paste and local save operations. Moreover, the access manager can be configured to prevent such copy/paste and local save operations. Further, the secure container and applications programmed and authorized to access documents from the secure container can be configured to prevent users from attaching such documents to emails or other forms of communication.

One or more applications (e.g., applications installed on the client device, and/or network applications accessed via the CEB) can be programmed or controlled (e.g., via policy-based enforcement) to write enterprise-related data only into the secure container. For instance, an application's source code can be provided with the resource name of the secure container. Similarly, a remote application (e.g., executing on a device other than the client device) can be configured to send data or documents only to the secure container (as opposed to other components or memory locations of the client device). Storing data to the secure container can occur automatically, for example, under control of the application, the client application, and/or the secure browser. The client application can be programmed to encrypt or decrypt documents stored or to be stored within the secure container. In certain embodiments, the secure container can only be used by applications (on the client device or a remote device) that are programmed to identify and use the secure container, and which have authorization to do so.

The network applications 406 can include sanctioned network applications 426 and non-sanctioned network applications 428. By way of a non-limiting example, sanctioned network applications 426 can include network applications from Workday, Salesforce, Office 365, SAP, and so on, while non-sanctioned network applications 426 can include network applications from Dropbox, Gmail, and so on. For instance, FIG. 4 illustrates a case where sanctioned applications 426 are accessed via a CEB. In operation (1), a user instance of a client application 404, that is installed on client device 402, can register or authenticate with the access gateway 422 of cloud services 408. For example, the user can authenticate the user to the client device and login to the client device 402. The client application can automatically execute, or be activated by the user. In some embodiments, the user can sign in to the client application (e.g., by authenticating the user to the client application). In response to the login or sign-in, the client application can register or authenticate the user and/or the client application with the access gateway 422.

In operation (2), in response to the registration or authentication, the access gateway 422 can identify or retrieve a list of enumerated network applications available or pre-assigned to the user, and can provide the list to the client application. For example, in response to the registration or authentication, the access gateway can identify the user and/or retrieve a user profile of the user. According to the identity and/or user profile, the access gateway can determine the list (e.g., retrieve a stored list of network applications matched with the user profile and/or the identity of the user). The list can correspond to a list of network applications sanctioned for the user. The access gateway can send the list to the client application or embedded browser, which can be presented via the client application or embedded browser to the user (e.g., in a storefront user interface) for selection.

In operation (3), the user can initiate connection to a sanctioned network application (e.g., a SaaS application), by selecting from the list of network applications presented to the user. For example, the user can click on an icon or other representation of the sanctioned network application, displayed via the client application or embedded browser. This user action can trigger the CEB to transmit a connection or access request to a server that provisions the network application. The request can include a request to the server (e.g., SaaS provider) to communicate with the access gateway to authenticate the user. The server can send a request to the access gateway to authenticate the user for example.

In operation (4), the access gateway can perform SSO with the server, to authenticate the user. For example, in response to the server's request to authenticate the user, the access gateway can provide credentials of the user to the server(s) 430 for SSO, to access the selected network application and/or other sanctioned network applications. In operation (5), the user can log into the selected network application, based on the SSO (e.g., using the credentials). The client application (e.g., the networking agent 412 and/or the remote session agent 416) can establish a secure connection and session with the server(s) 430 to access the selected network application. The CEB can decrypt application traffic received via the secure connection. The CEB can monitor traffic sent via the CEB and the secured connection to the servers 430.

In operation (6), the client application can provide information to the analytics services 424 of cloud services 408, for analytics processing. For example, the cloud services agent 414 of the client application 404 can monitor for or capture user interaction events with the selected network application. The cloud services agent 414 can convey the user interaction events to the analytics services 424, to be processed to produce analytics.

Figure 5:
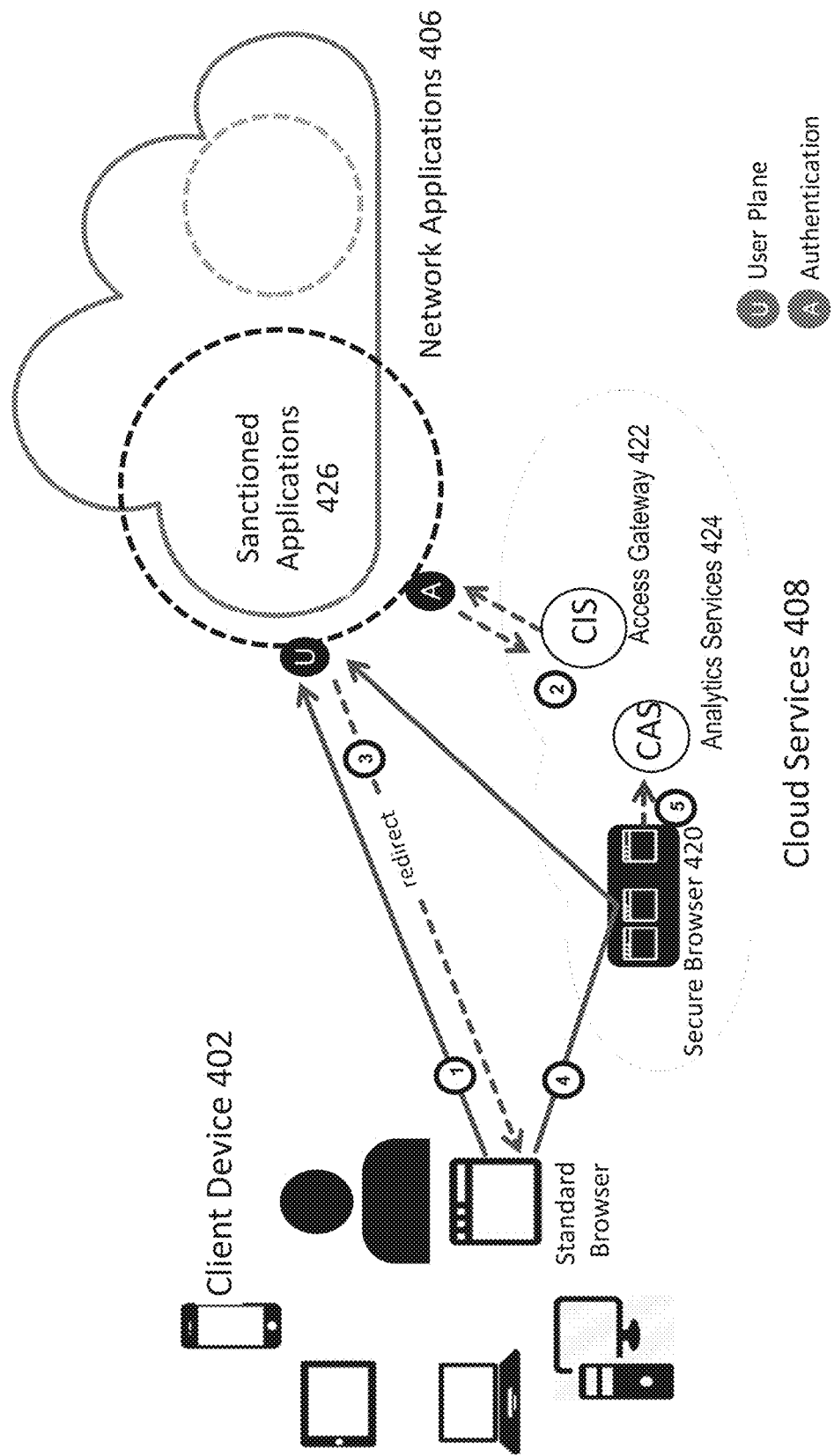
FIG. 5 is a block diagram of an example embodiment of a system for using a secure browser.

FIG. 5 depicts an example embodiment of a system for using a secure browser. In brief overview, the system includes cloud services 408, network applications 406 and client device 402. In some embodiments, various elements of the system are similar to that described above for FIG. 4, but that the client application (with embedded browser) is not available in the client device 402. A standard or typical browser may be available on the client device, from which a user can initiate a request to access a sanctioned network application for instance. A network application can be specified as being sanctioned or unsanctioned via policies that can be set by an administrator or automatically (e.g., via artificial intelligence).

For example, in operation (1), the user may log into the network application using the standard browser. For accessing a sanctioned network application, the user may access a predefined URL and/or corresponding webpage of a server that provisions the network application, via the standard browser, to initiate a request to access the network application. In some embodiments, the request can be forwarded to or intercepted by a designated gateway service (e.g., in a data path of the request). For example, the gateway service can reside on the client device (e.g., as an executable program), or can reside on a network device 432 of the cloud services 408 for instance. In some embodiments, the access gateway can correspond to or include the gateway service. The gateway service can determine if the requested network application is a sanctioned network application. The gateway service can determine if a CEB initiated the request. The gateway service can detect or otherwise determine that the request is initiated from a source (e.g., initiated by the standard browser) in the client device other than a CEB. In some embodiments, there is no requirement for a designated gateway service to detect or determine if the request is initiated from a CEB, for example if the requested network application is sanctioned, that user is initiating the request via a standard browser, and/or that the predefined URL and/or corresponding webpage is accessed.

In operation (2), the server may authenticate the user via the access gateway of the cloud services 408. The server may communicate with the access gateway to authenticate the user, in response to the request. For instance, the request can include an indication to the server to communicate with the access gateway to authenticate the user. In some embodiments, the server is pre-configured to communicate with the access gateway to authenticate the user, for requests to access a sanctioned network application. The server may send a request to the access gateway to authenticate the user. In response to the server's request to authenticate the user, the access gateway can provide credentials of the user to the server 430.

In operation (3), the gateway service and/or the server can direct (or redirect) all traffic to a secure browser 420 which provides a secure browsing service. This may be in response to at least one of: a determination that the requested network application is a sanctioned network application, a determination that the request is initiated from a source other than a CEB, a determination that the requested network application is sanctioned, a determination that user is initiating the request via a standard browser, and/or a determination that the predefined URL and/or corresponding webpage is accessed.

The user's URL session can be redirected to the secure browser. For example, the server, gateway service and/or the access gateway can generate and/or send a URL redirect message to the standard browser, responsive to the determination. The secure browser plug-in of the standard browser can receive the URL redirect message, and can for example send a request to access the non-sanctioned network application, to the secure browser 420. The secure browser 420 can direct the request to the server of the non-sanctioned network application. The URL redirect message can instruct the standard browser (and/or the secure browser plug-in) to direct traffic (e.g., destined for the network application) from the standard browser to the secure browser 420 hosted on a network device. This can provide clientless access and control via dynamic routing though a secure browser service. In some embodiments, a redirection of all traffic to the secure browser 420 is initiated or configured, prior to performing authentication of the user (e.g., using SSO) with the server.

In some embodiments, the gateway service can direct or request the server of the requested network application to communicate with the secure browser 420. For example, the gateway service can direct the server and/or the secure browser to establish a secured connection between the server and the secure browser, for establishing an application session for the network application.

In some embodiments, the secured browser 420 comprises a browser that is hosted on a network device 432 of the cloud services 408. The secured browser 420 can include one or more features of the secured browser 420 described above in connection with at least FIG. 4 for instance. The hosted browser can include an embedded browser of a CEB that is hosted on the network device 432 instead of on the client device. The hosted browser can include an embedded browser of a hosted virtualized version of the CEB that is hosted on the network device 432. Similar to the CEB installed on the client device, traffic is routed through the CEB hosted on the network device, which allows an administrator to have visibility of the traffic through the CEB and to remain in control for security policy control, analytics, and/or management of performance.

Figure 6:
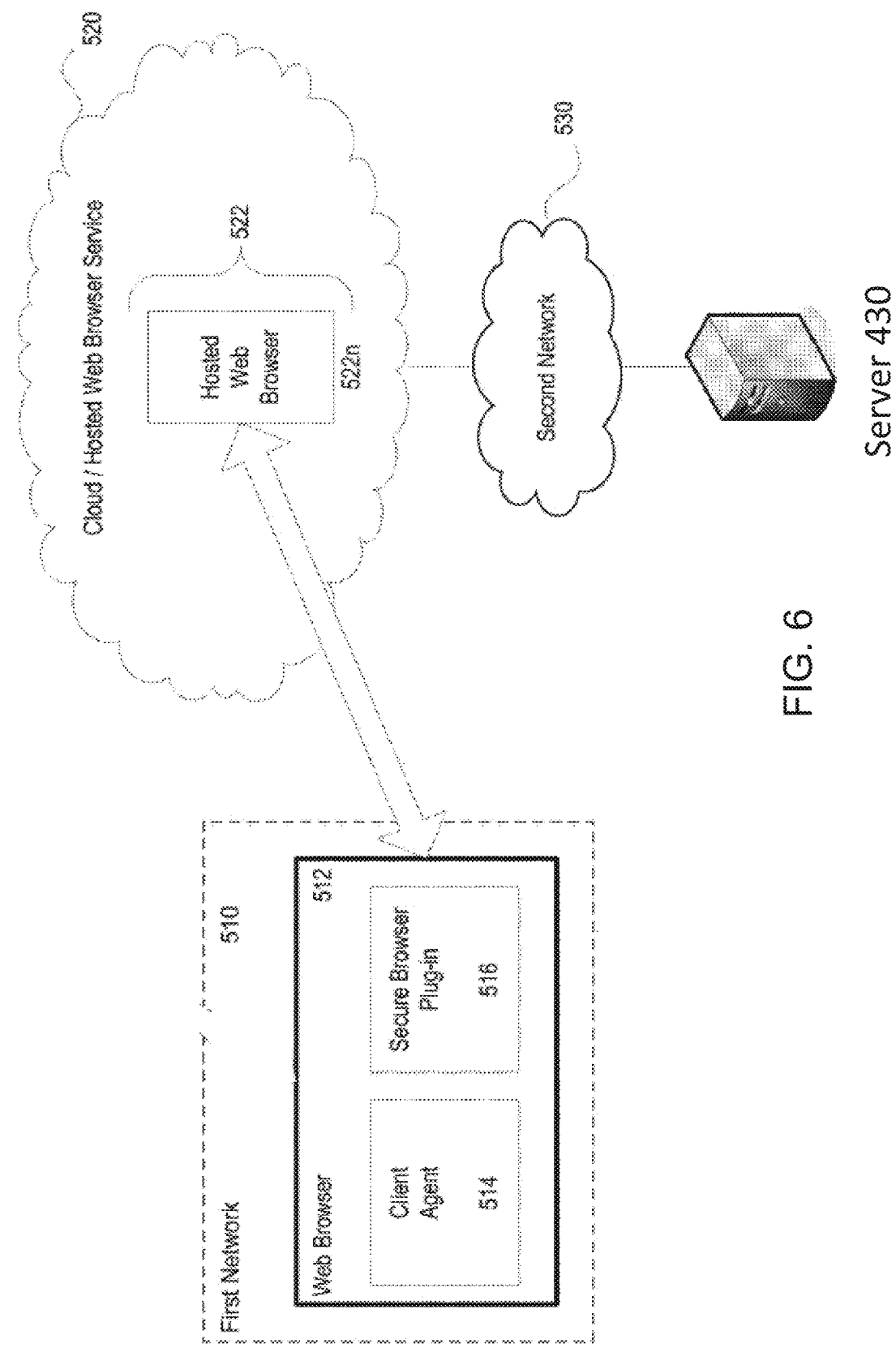

FIG. 6 illustrates an example implementation for browser redirection using a secure browser plug-in. In brief overview, the implementation includes a web browser 512 with a secure browser plug-in 516 operating on a client device, and a hosted web browser (or secure browser) 522 residing on a network device. The web browser 512 can correspond to a standard browser, instead of an embedded browser as discussed above in connection with FIG. 4 for example. The secure browser plug-in 516 can execute within a first network 510 and access a server 430 in a second network 530. The first network 510 and the second network 530 are for illustration purposes and may be replaced with fewer or additional computer networks. A secure browser plug-in 516 can be installed on the standard browser 512. The plug-in can include one or more components. One such component can include an ActiveX control or Java control or any other type and/or form of executable instructions capable of loading into and executing in the standard browser. For example, the standard browser can load and run an Active X control of the secure browser plug-in 516, in a memory space or context of the standard browser. In some embodiments, the secure browser plug-in can be installed as an extension on the standard browser, and a user can choose to enable or disable the plugin or extension. The secure browser plug-in can communicate and/or operate with the secured browser 420 for securing, using and/or accessing resources within the secured portion of the digital workspace.

By using the secure browser plug-in 516 operating within the standard browser 512 network applications accessed via the standard browser 512 can be redirected to a hosted secure browser. For instance, the secure browser plug-in 516 can be implemented and/or designed to detect that a network application is being accessed via the standard browser, and can direct/redirect traffic from the client device associated with the network application, to the hosted secure browser. The hosted secure browser can direct traffic received from the network application, to the secure browser plug-in 516 and/or a client agent 514 for rendering and/or display for example. The client agent 514 can execute within the web browser 512 and/or the secure browser plug-in, and can include certain elements or features of the client application 404 discussed above in connection with at least FIG. 4 for example. For instance, the client agent 514 can include a remote session agent 416 for rendering the network application at the web browser 512. In some embodiments, the network application is rendered at the hosted secure browser, and the rendered data is conveyed or mirrored to the secure browser plug-in 516 and/or the client agent 514 for processing and/or display.

By way of an example, a user may be working remotely and may want to access a network application that is internal to a secure corporate network while the user is working on a computing device connected to an unsecure network. In this case, the user may be utilizing the standard browser 512 executing in the first network 510, in which the first network 510 may comprise an unsecure network. The server 430 that the user wants to access may be on the second network 530, in which the second network 530 comprises a secure corporate network for instance. The user might not be able to access the server 430 from the unsecure first network 510 by clicking on an internal uniform record locator (URL) for the secure website 532. That is, the user may need to utilize a different URL (e.g., an external URL) while executing the standard browser 512 from the external unsecure network 510. The external URL may be directed to or may address one or more hosted web browsers 522 configured to access server(s) 430 within the second network 530 (e.g., secure network). To maintain secure access, the secure browser plug-in 516 may redirect an internal URL to an external URL for a hosted secure browser.

The secure browser plug-in 516 may be able to implement network detection in order to identify whether or not to redirect internal URLs to external URLs. The standard browser 512 may receive a request comprising an internal URL for a website executing within the secure network. For example, the standard browser 512 may receive the request in response to a user entering a web address (e.g., for secure website 532) in the standard browser. The secure browser plug-in 516 may redirect the user web browser application 512 from the internal URL to an external URL for a hosted web browser application. For example, the secure browser plug-in 516 may replace the internal URL with an external URL for the hosted web browser application 522 executing within the secure network 530.

The secure browser plug-in 516 may allow the client agent 514 to be connected to the hosted web browser application 522. The client agent 514 may comprise a plug-in component, such as an ActiveX control or Java control or any other type and/or form of executable instructions capable of loading into and executing in the standard browser 512. For example, the client agent 514 may comprise an ActiveX control loaded and run by a standard browser 512, such as in the memory space or context of the user web browser application 512. The client agent 514 may be pre-configured to present the content of the hosted web browser application 522 within the user web browser application 512.

The client agent 514 may connect to a server or the cloud/hosted web browser service 520 using a thin-client or remote-display protocol to present display output generated by the hosted web browser application 522 executing on the service 520. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

The hosted web browser application 522 may navigate to the requested network application in full-screen mode, and can render the requested network application. The client agent 514 may present the content or rendition of the network application on the web browser application 512 in a seamless and transparent manner such that it appears that the content is being displayed by the standard browser 512, e.g., based on the content being displayed in full screen mode. In other words, the user may be given the impression that the website content is displayed by the user web browser application 512 and not by the hosted web browser application 522. The client agent 514 may transmit navigation commands generated by the user web browser application 512 to the hosted web browser application 522 using the thin-client or remote-display protocol. Changes to the display output of the hosted web browser application 522, due to the navigation commands, may be reflected in the user web browser application 512 by the client agent 514, giving the impression to the user that the navigation commands were executed by the user web browser application 512.

Referring again to FIG. 5, and in operation (4), a new browser tab can open on the standard browser, to render or display the secure browser session. The new browser tab can be established or opened by the secure browser plug-in for instance. The secure browser plug-in and/or a client agent can receive data from the secure browser session, and can render the network application within the new browser tab as discussed above in connection with FIG. 6 for instance.

In operation (5), the secure browser can feed all user interaction events via the network application, back to analytics service for processing. The secure browser plug-in can monitor for and intercept any user interaction events directed to the rendition of the network application within the browser tab. Hence, a user can use a native (or standard) browser to access a network application while allowing visibility into the network application's traffic, via the inter-operation of cloud services and a secure browser (in the absence of the client application).

Figure 7:
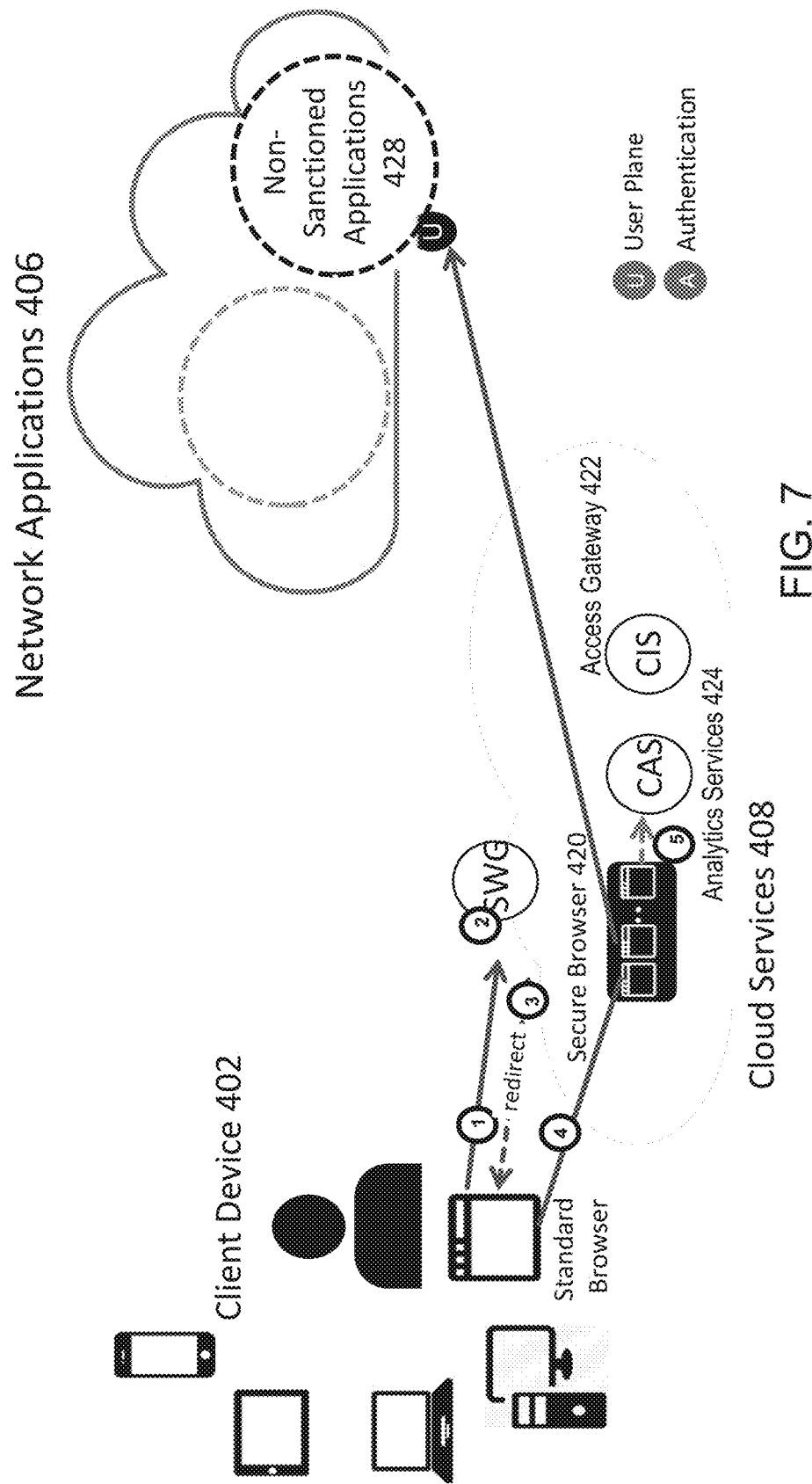
FIG. 7 is a block diagram of example embodiment of a system of using a secure browser.

FIG. 7 depicts another example embodiment of a system of using a secure browser. In brief overview, the system includes cloud services 408, network applications 406 and the client device 402. In some embodiments, various elements of the system are similar to that described above for FIG. 5. A client application with embedded browser is not available in the client device 402. A standard or typical (e.g., HTML5) browser is available on the client device, from which a user can initiate a request to access a non-sanctioned network application. A network application can be specified as being sanctioned or non-sanctioned via policies that can be set by an administrator or automatically (e.g., via artificial intelligence).

In operation (1), the user may attempt to log into a non-sanctioned network application using the standard browser. The user may attempt to access a webpage of a server that provisions the network application, and to initiate a request to access the network application. In some embodiments, the request can be forwarded to or intercepted by a designated gateway service (e.g., in a data path of the request). For example, the gateway service (sometimes referred to as SWG) can reside on the client device (e.g., as an executable program), or can reside on a network device 432 of the cloud services 408 for instance. The gateway service can detect or otherwise determine if the requested network application is a sanctioned network application. The gateway service can determine if a CEB initiated the request. The gateway service can detect or otherwise determine that the request is initiated from a source (e.g., initiated by the standard browser) in the client device other than a CEB.

In operation (2), the gateway service detects that the requested network application is a non-sanctioned network application. The gateway service can for instance extract information from the request (e.g., destination address, name of the requested network application), and compare the information against that from a database of sanctioned and/or non-sanctioned network applications. The gateway service can determine, based on the comparison, that the requested network application is a non-sanctioned network application.

In operation (3), responsive to the determination, the gateway service can block access to the requested network application, e.g., by blocking the request. The gateway service can generate and/or send a URL redirect message to the standard browser, responsive to the determination. The URL redirect message can be similar to a URL redirect message sent from the server to the standard browser in FIG. 5 in operation (3). A secure browser plug-in of the standard browser can receive the URL redirect message, and can for example send a request to access the non-sanctioned network application, to the secure browser 420. The secure browser 420 can direct the request to the server of the non-sanctioned network application.

The server of the non-sanctioned network application may authenticate the user via the access gateway of the cloud services 408, e.g., responsive to receiving the request from the secure browser. The server may communicate with the access gateway to authenticate the user, in response to the request. The server may send a request to the access gateway to authenticate the user. In response to the server's request to authenticate the user, the access gateway can provide credentials of the user to the server 430. Upon authentication, the secure browser (or a corresponding CEB) can establish a secured connection and an application session with the server.

In operation (4), a new browser tab can open on the standard browser, to render or display the secure browser's application session. The new browser tab can be established or opened by the secure browser plug-in for instance. The secure browser plug-in and/or a client agent can receive data from the secure browser session, and can render the network application within the new browser tab as discussed above in connection with FIGS. 5-6 for instance.

In operation (5), the secure browser can feed all user interaction events via the network application, back to analytics service for processing. The secure browser plug-in can monitor for and intercept any user interaction events directed to the rendition of the network application within the browser tab. Hence, a user can use a native (or standard) browser to access a network application while allowing visibility into the network application's traffic, via the inter-operation of cloud services and a secure browser (in the absence of the client application).

In some embodiments, in the absence or non-availability of a CEB on the client device, browser redirection is performed so that each requested network application is accessed via a corresponding hosted secure browser (or hosted CEB) for handling, instead of having all traffic redirected through a single hosted secure browser (or hosted CEB). Each dedicated secure browser can provide compartmentalization and improved security.

The use of a CEB, whether hosted or local to the client device, can allow for end-to-end visibility of application traffic for analytics, service level agreement (SLA), resource utilization, audit, and so on. In addition to such visibility, the CEB can be configured with policies for managing and controlling any of these as well as other aspects. For example, DLP features can be supported, to control "copy and paste" activities, download of files, sharing of files, and to implement watermarking for instance. As another example, the CEB can be configured with policies for managing and controlling access to local drives and/or device resources such as peripherals.

Figure 8:
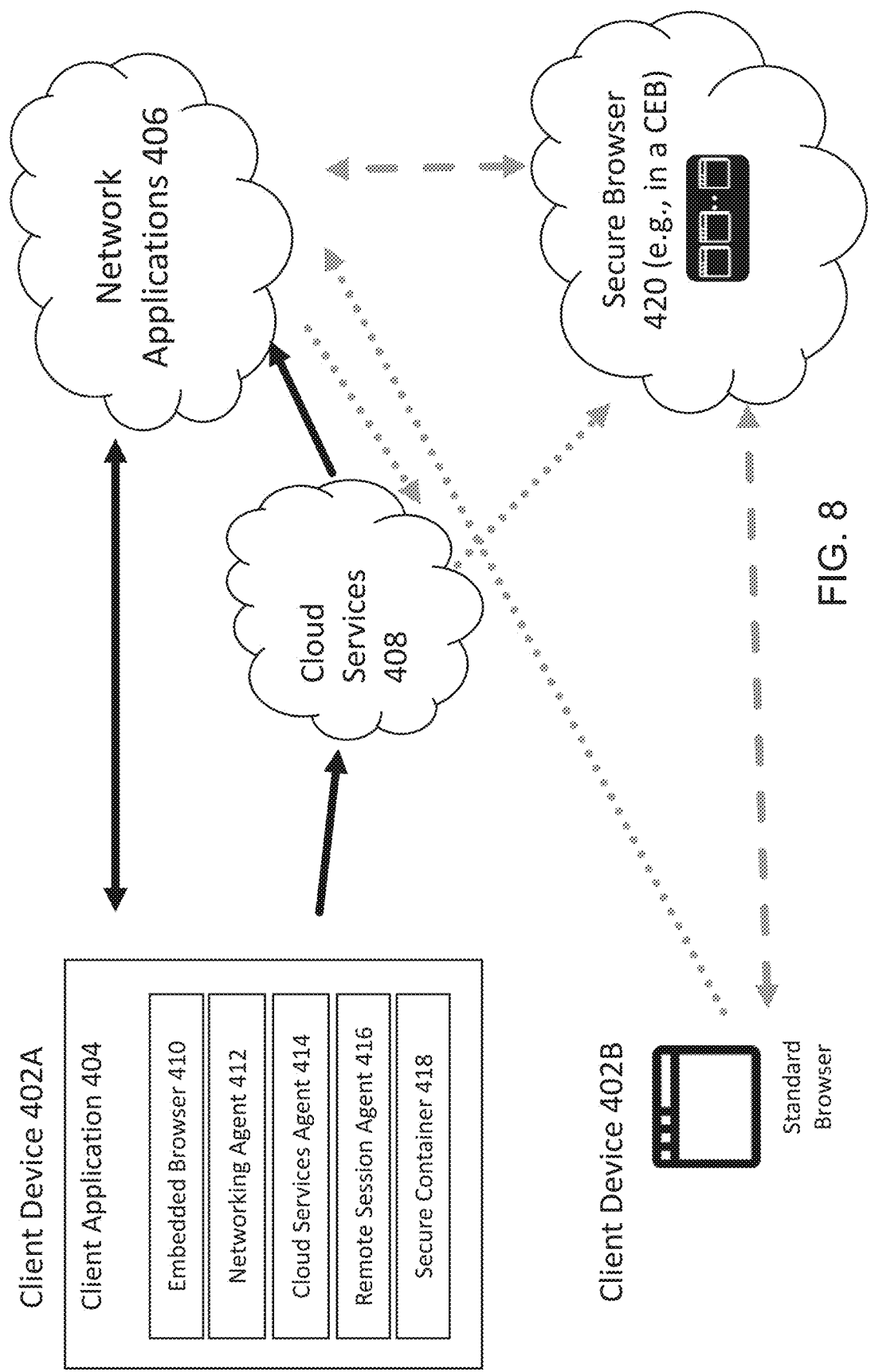
FIG. 8 is a block diagram of an example embodiment of a system for using local embedded browser(s) and hosted secured browser(s)

Referring now to FIG. 8, an example embodiment of a system for using local embedded browser(s) and hosted secured browser(s) is depicted. An environment is shown where different types of client devices 402A, 402B may be used (e.g., in a BYOD context), such that one may be locally equipped with a suitable CEB, and another client device may not have a suitable local CEB installed. In such an environment, systems described in FIGS. 4, 5 and 7 can be used to support each of the client devices based on the availability of a locally installed and suitable CEB.

Figure 9:
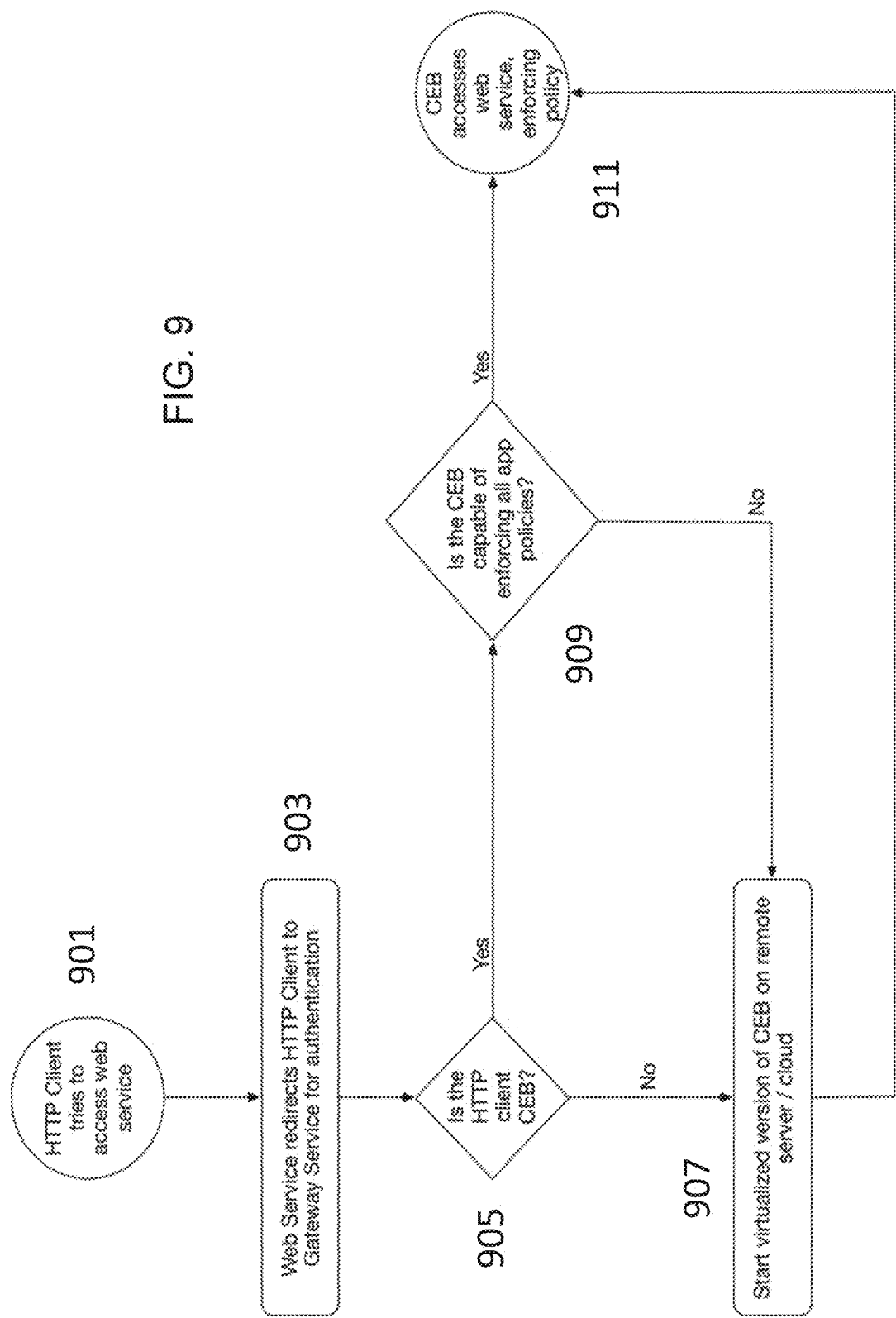
FIG. 9 is an example process flow for using local embedded browser(s) and hosted secured browser(s)

FIG. 9 depicts an example process flow for using local embedded browser(s) and hosted secured browser(s). The process flow can be used in the environment described above in FIG. 8, to determine whether an embedded browser or a hosted secured browser should be used for each client device to access a network application. For example, in operation 901, a HTTP client can attempt to access a web service (e.g., server of a network application). In operation 903, the web service can redirect the HTTP client to a gateway service for authentication. In operation 905, the gateway service can determine if the HTTP client is a CEB. If so, in operation 909, the gateway service can determine if the CEB is a suitable CEB, e.g., capable of enforcing defined application policies. If so, in operation 911, the CEB is allowed access to the web service, and can enforce the defined policies.

If the gateway service determines that the HTTP client is not a CEB, the gateway service can cause a virtualized version of a CEB to be initialized and hosted on a remote server (e.g., a network device 432 of cloud services 408), in operation 907. In some embodiments, such a hosted CEB may already be available on a network device 432, and can be selected for use. For example in operation 911, the CEB is allowed access to the web service, and can enforce the defined policies.

If the gateway service determines that the HTTP client is a CEB, but that the CEB is not a suitable CEB, the gateway service can cause a virtualized version of a CEB to be initialized and hosted on a remote server (e.g., a network device 432 of cloud services 408), in operation 907. In some embodiments, such a hosted CEB may already be available on a network device 432, and can be selected for use. For example in operation 911, the CEB is allowed access to the web service, and can enforce the defined policies.

In some embodiments, if the user is requesting access to a web application located in a company data center, the gateway service (in cloud service or on premise) can allow access when the client application with CEB is detected. Otherwise, the request can be routed to a service with the hosted virtualized version of the CEB, and then access is authenticated and granted.

At operation 905 and/or operation 909 for instance, the decisions made on whether the HTTP client is a CEB and whether it is a suitable CEB may be determined by a number of factors. For example, to determine if the HTTP client is CEB, the gateway service may take into account factors, for example including at least one of: user Identity and strength of authentication, client Location, client IP Address, how trusted the user identity, client location, client IP are, jailbreak status of the client device, status of anti-malware software, compliance to corporate policy of the client device, and/or remote attestation or other evidence of integrity of the client software.

To determine if the CEB is able to honor or support all defined application policies (which may vary by client version, client OS platform and other factors), the client device's software and gateway service may perform capability negotiation and/or exchange version information. In some embodiments, the gateway service can query or check a version number or identifier of the CEB to determine if the CEB is a suitable CEB to use.

Driving all the traffic though the CEB then allows additional control of content accessing SaaS and Web based systems. Data Loss Prevention (DLP) of SaaS and Web traffic can be applied through the CEB app with features including copy and paste control to other CEB access applications or IT managed devices. DLP can also be enforced by enabling content to be downloaded only to designated file servers or services under IT control.

Figure 10:
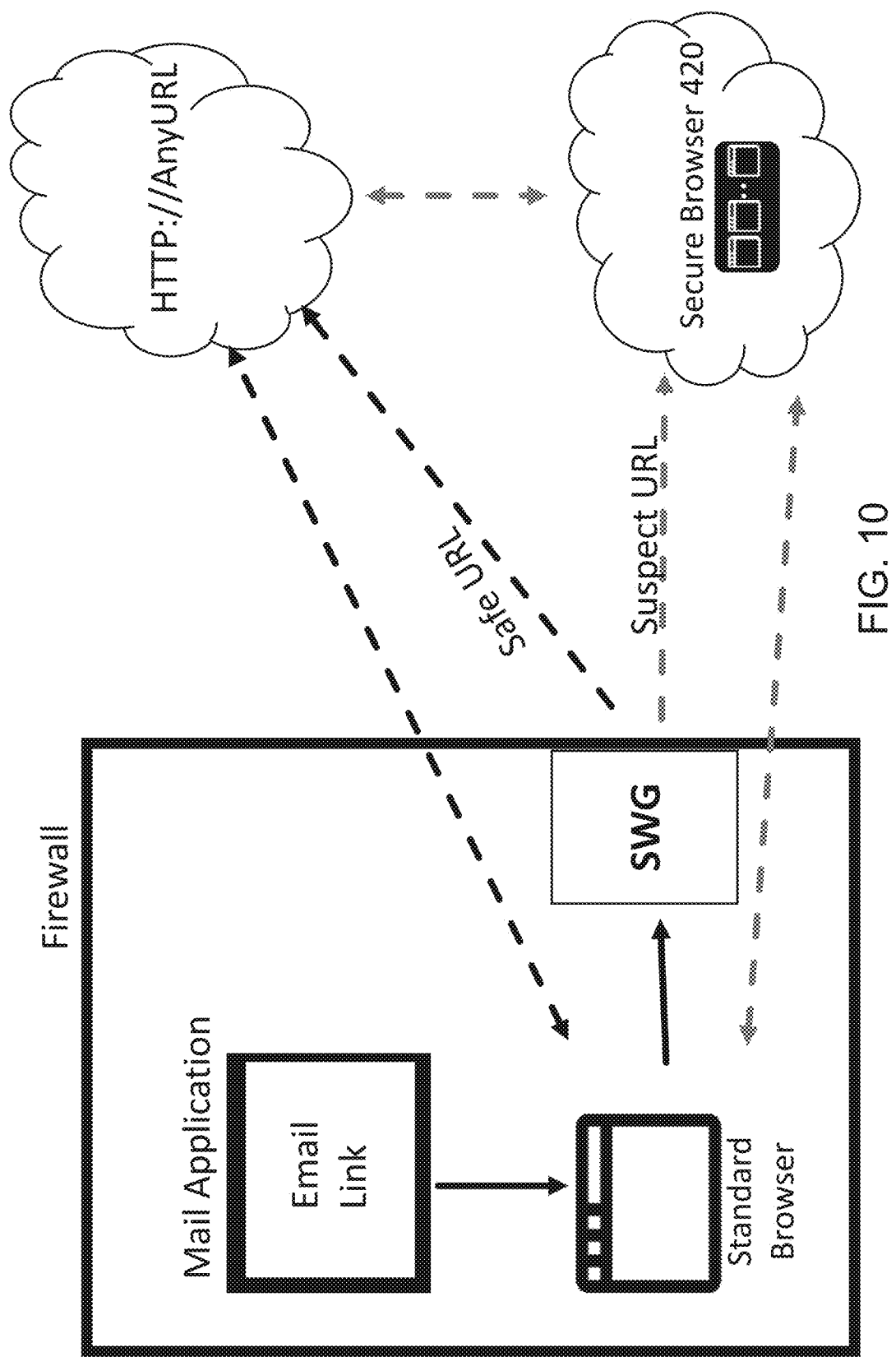
FIG. 10 is an example embodiment of a system for managing user access to webpages.

Referring now to FIG. 10, depicted is an example embodiment of a system for managing user access to webpages. Some webpages (or websites) are known to be safe while others may be suspect. A user may access a webpage via a corresponding URL through a standard browser. For example, the user may click on a link corresponding to the URL, which may be included in an email being viewed using a mail application. An access gateway (SWG) may intercept an access request generated by the clicking of the link, and can determine if the corresponding URL is safe or suspect. If the URL is known to be safe, the access gateway can allow the request to proceed to the corresponding website or web server. If the URL is suspect, the access gateway can redirect the request to be handled via a hosted secure browser. The secure browser can request access for, and access the webpage (on behalf of the standard browser), and can allow the webpage information to be conveyed to the standard browser, similar to the handling of a network application via browser redirection as discussed in connection with at least FIGS. 7 and 5.

C. Systems and Methods for Generating Training Content for Completion of Tasks and Recording Application Level Information of a User Across a Plurality of Network Applications In various embodiments, a machine may monitor user interactions with applications and may observe the interactions to learn to train less adept users to interact with applications. For example, there is a spread between the most proficient users of an application or system, and the rest of the users who may not yet be as proficient. A client application (e.g., "a SaaS container") may watch and potentially record user interactions. By watching and potentially recording user interactions by proficient users of a network application, training may be created. For instance, for a given task within a network application, a machine may take various actions. A machine may (i) classify user interactions into tasks, where each task might require multiple steps across multiple applications. The machine may (ii) identify a baseline for how long it takes to accomplish a task. This is a task distribution across the population of users that have attempted to complete the task. Note that the population of users may be across a subgroup in the enterprise, across the enterprise, or even across multiple enterprises (wisdom of the crowd) i.e. across the community of all users. The machine may (iii) identify the set of users that are more proficient. The machine may (iv) identify "best practices" as the things that are common across the efficient user set and/or select a representative user session from the proficient user set 613 as a training example. The machine may (v) sanitize the training example—removing sensitive information, identifiable information, etc. The machine may (vi) identify a user session that is taking longer that baseline plus some deviation. The machine may (vii) offer the user of this session help. If they click on help—the machine may show them a recording of the training example. The machine may (viii) allow user to rate whether or not the example was helpful. Finally, the machine may (ix) utilize this feedback to pick superior samples from several training example.

Moreover, the machine may implement "imitation learning." For instance, as machine learning gets more advanced, the observing machine can be trained to not just pick a single user run as the training example, but rather generalize across multiples runs across multiple users, to synthetically create an "optimal" training example that can then be used to train/help users attempting the task.

The machine may implement "optimized SaaS session recording." Since the network application sessions in the embedded browser ("SaaS sessions") are fundamentally rendered from higher order representations—HTTP and HTML requests and responses, rather than video screen recordings, it is possible to record and replay these sessions by recording and replaying the higher level representations of them. For instance, the machine may record http and html level session and interaction information (user input, key/mouse movement, timing, etc.) and/or track browser session and browser state. For example, the machine may record the output to the HTML DOM that is actually rendered by the browser. The output may, in various instances, be free from any JavaScript. This is in contrast to the "input" which may be JavaScript with calls and dependencies to internet services, etc. When replaying the content, executing JavaScript is avoided and instead the recorded DOM representations are re-rendered. Secure SaaS as the mediating browser into which the original session was rendered, is conveniently located at the right point of abstraction to be able to record these highly efficient representations of user's interactions with the system. These representations are efficient both in terms of bytes required to store them; but also because they are more machine friendly, and therefore more amenable to analysis by machines—e.g., to look for specific behaviors across a large collection of recordings, or to use the records as subsequent input to machine learning algorithms.

Figure 11:
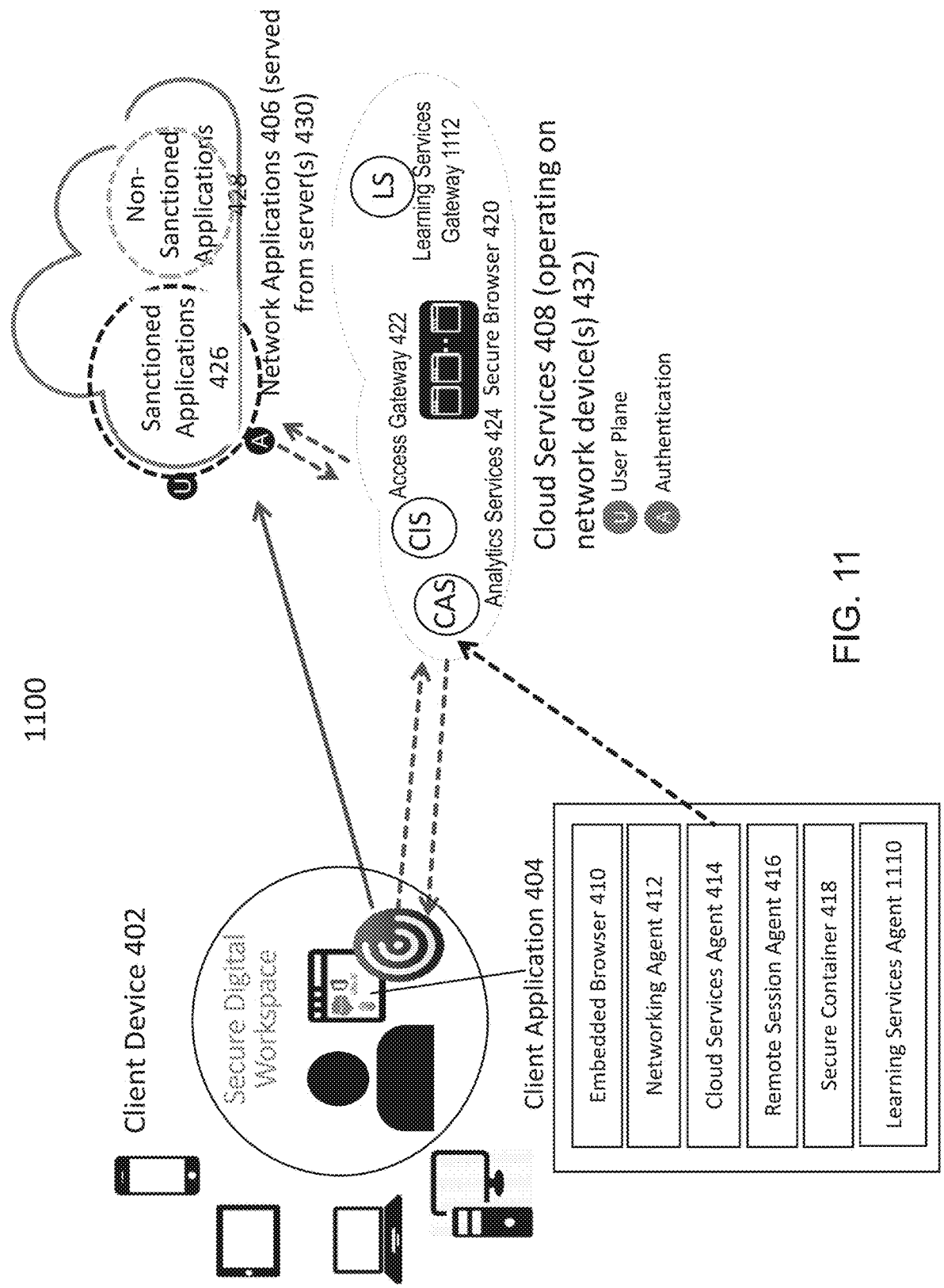
FIG. 11 is an example embodiment of a system for presenting additional content for a network application accessed via an embedded browser of a client application.

Referring to FIG. 11, depicted is a block diagram of one embodiment of a system 1100 for presenting additional content for a network application 406 accessed via an embedded browser 410 of a client application 1305. The system 1100 may include a client application 404 that includes an embedded browser 410 that can render information of a network application 406 accessed via the client application 404. The client application 404 may include a learning services agent 1110 which interoperates with the embedded browser 410 to provide learning services. The learning services agent 1110 may also interoperate with cloud services 408 operating on network device(s) 432.

Cloud services 408 may include learning services 1112. The learning services 1112 can be configured to exchange data with the learning services agent 1110. This data can include data relating to generating training content, selecting training content to serve or provide, or receiving feedback on the training content which are rendered in the embedded browser 410 or the client application 404.

The learning services agent 1110 can include a script, instructions, code, one or more engines or components that can cause the client application to provide training content to a user of the client application. The training content can include content that can be used by a user to perform one or more tasks on one or more network applications 406 accessed via an embedded browser 410 of the client application 404. The client application 404 may be an instance of the client application 404 previously detailed herein. The client application 404 with the embedded browser 410 (CEB) can include any element of a CEB as previously described herein. The network application may include any type or form of network application 406 previously detailed herein. In some embodiments, the client applications 404 may execute on a client device 402 operated by a user.

Each of the above-mentioned elements or entities is implemented in hardware, or a combination of hardware and software, in one or more embodiments. Each component of the system 1100 may be implemented using hardware or a combination of hardware or software detailed above in connection with FIG. 1. For instance, each of these elements or entities can include any application, program, library, script, task, service, process or any type and form of executable instructions executing on hardware of a client device (e.g., the client applications 404). The hardware includes circuitry such as one or more processors in one or more embodiments.

Figure 12:
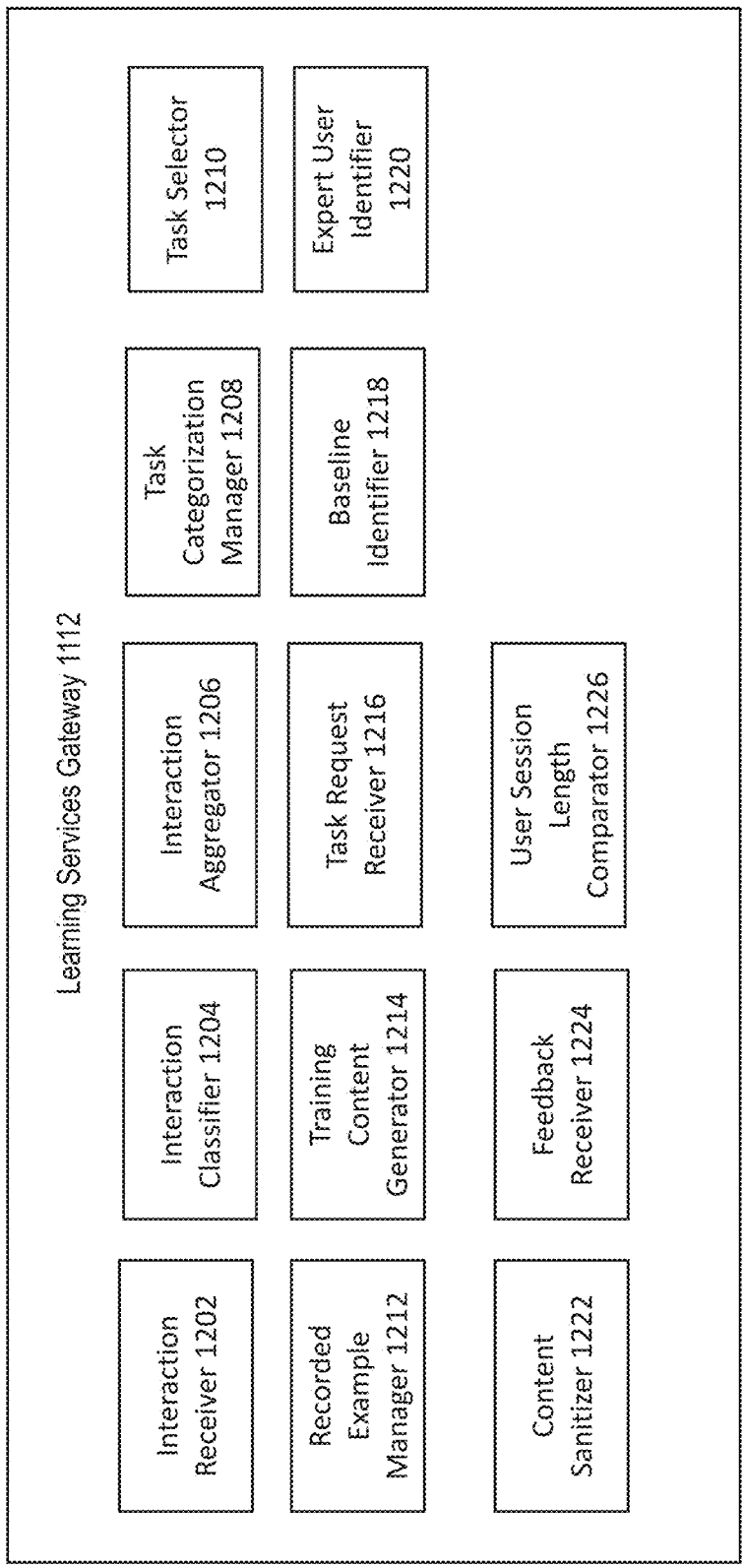
FIG. 12 is a block diagram of a learning services agent.

With reference to FIG. 12, various components of a learning services agent 1110 are provided. Moreover, while these components are discussed with reference to the learning services agent 1110 for convenience and brevity, these components may, in whole or part, be aspects of the learning services 1112. Thus, one may appreciate that reference to components of the learning services agent 1110 may alternatively be reference to components of the learning services 1112 in various configurations of the system 1100. Moreover, various configurations of the system may omit the learning services agent 1110, its role being handled by other aspects of the client applications 404, such as the embedded browser 410. Thus, the embedded browser 410 may be integrated into the client application 404. Additionally, various configurations of the system may omit the learning services 1112, its role being handled by the cloud services 408, such as the access gateway 422 and/or analytics services 424.

The learning services agent 1110 may include a session establisher 1202. The session establisher 1202 may establish one or more sessions between network applications 406 and a client application 404 of a client device 402 of a user via the embedded browser 410 within the client application 404. For example, a user may request to utilize, access or otherwise communicate with a network application 410.

Moreover, a user utilizing a network application may indicate a request to utilize learning services (e.g., training content) in connection with the network application. A session between the user (specifically, the client application having the embedded browser and accessing the network application at issue) and the learning services 1112 may be established by the learning services agent 1110 of the client application.

The learning services agent 1110 may include an input tracker 1204. For example, the input tracker 1204 may track, by the client application, user input and pointer movement of interactions by the user. As a user clicks a mouse, types on a keyboard, interacts with a touch screen, stimulates a microphone, or otherwise interacts with a human-to-machine interface of the user device to provide inputs to (or receive outputs from) a network application, the input tracker 1204 can be configured to receive these interactions.

The learning services agent 1110 may include an output representation interceptor 1206. The output representation interceptor 1206 may intercept, by the client application, output representation of application layer protocol data of interactions of the user with the plurality of network applications accessed via the embedded browser 410 of the client application 404. The output representation may be outputted to a document object model for rendering by the embedded browser. For instance, the network application may provide human-readable content for provision to the user on a human-to-machine interface of the user device. The output representation interceptor 1206 also receives these outputs. The outputs may include data representing interactions of a user with network applications.

In various instances, data representative of the output representation is encrypted. Thus, in various instances, the output representation interceptor 1206 may also intercept data representative of the output representation at a point between decryption of content from a network stack of the client device and rendering on the display of the client device. The output representation interceptor 1206 may be configured to identify data corresponding to the output representation of the network application that is received by the client application from a server of the network application and use the data to determine if the user interactions tracked by the input tracker 1204 correspond to a particular task or activity.

The learning services agent 1110 may include a recording engine or module 1208. The recording module 1208 can be configured to monitor and record interactions performed by one or more users via the embedded browser of the client application. The recording module 1208 can be configured to record interactions performed by a user accessing a network application via the embedded browser. The recording module 1208 may be configured to intercept data at one or more layers of the embedded browser such that interactions performed by the user may be intercepted at one of the application layers of the embedded browser.

For example, the recording module 1208 may record the intercepted output representation and the tracked user input and pointer movement to record the one or more sessions of the user. The recording module 1208 may store data representative of the output representation and/or the tracked user input and pointer movement. In this manner, the inputs and the outputs mentioned elsewhere as being provided to an interaction receiver 1302 of the learning services 1112 (see FIG. 13) may be collected.

The learning services agent 1110 may include a state tracker 1210. For example, the state tracker 1210 may track a state of the one or more sessions and the embedded browser. In some embodiments, the state tracker 1210 may track the client application including a state of the client application. In some embodiments, the state tracker 1210 may track the embedded browser and one or more states of the embedded browser. For example, a state of the session and/or embedded browser may include information regarding whether a user is presently interacting or previously interacted with the one or more sessions, the client application, or the embedded browser. The state of the session and/or embedded browser may include information regarding whether outputs are being provided or inputs are being provided. Similarly, the state of the session and/or embedded browser may include, information regarding whether an error exists, or whether a successful completion of an interaction and/or task occurred. The state may be provided to the state tracker 1210 by the client application. Alternatively, the state tracker 1210 may implement machine learning techniques to determine the state of the session. The state corresponds to the user interactions, such as to give context to the user interaction to augment the inputs collected by the input tracker 1204 and/or outputs collected by the output representation interceptor 1206.

Figure 13:
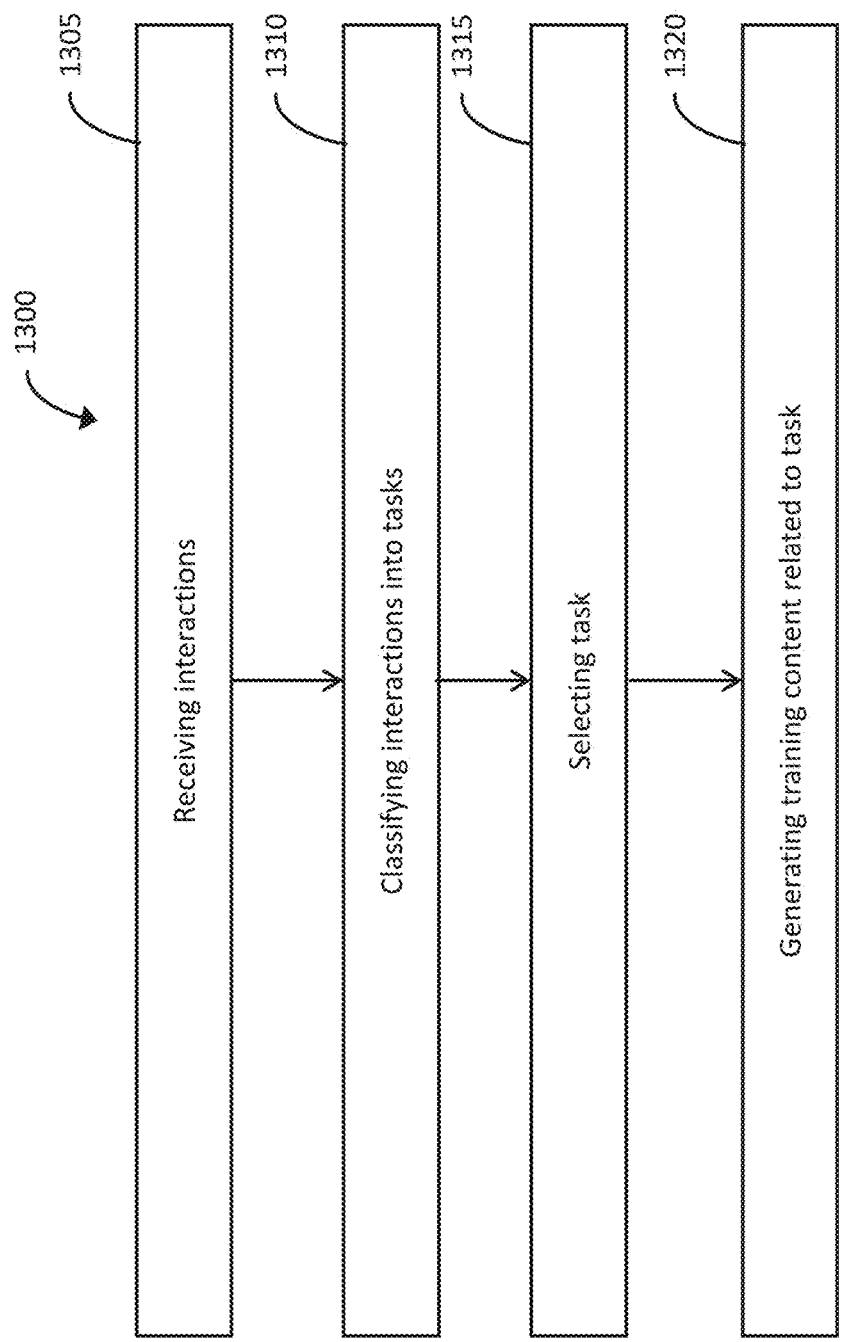
FIG. 13 is a block diagram of learning services executing on cloud services.

With reference to FIG. 13, various components of the learning services 1112 are provided. Moreover, while these components are discussed with reference to the learning services 1112 for convenience and brevity, these components may, in whole or part, be aspects of the learning services agent 1110. Thus, one may appreciate that reference to components of the learning services 1112 may alternatively be reference to components of the learning services agent 1110 in various configurations of the system 1100. Moreover, various configurations of the system 1100 may omit the learning services agent 1110, its role being handled by other aspects of the client applications 404, such as the embedded browser 410. Additionally, various configurations of the system 1100 may omit the learning services 1112, its role being handled by the cloud services 408, such as the access gateway 422 and/or analytics services 424.

The learning services 1112 may include an interaction receiver 1302. For example, the interaction receiver 1302 may receive, from each client application of a plurality of client applications executing on respective client devices, interactions recorded by the client application via an embedded browser of the client application. Other mechanisms of recordation of the interactions are also contemplated. In various embodiments, the interactions are recorded by the recording module 1208 (FIG. 12) of the learning services agent 1110 (FIG. 12). The interaction receiver 1302 may receive the data representative of the interactions and provide it to other aspects of the learning services 1112 and/or transmit it to the learning services agent 1110. The interaction receiver 1302 may receive a variety of types of interactions. For example, interactions may include a user click on a screen display object, such as a click button or a radio button. Interactions may include a user scroll on a screen display object, such as scrolling a display object up, down, left, right, etc. Interactions may include a user data entry such as typing data into a field of a screen display object such as a text field. Interactions may include a user mouse or touch screen action.

In various embodiments, the client application 404 intercepts output representation of application layer protocol data of interactions of a user with the plurality of network applications. The output representation can be outputted to a document object model for rendering by the embedded browser. In various embodiments, the interception is carried out by the learning services agent 1110. For instance, the output representation interceptor 1206 mentioned above may intercept the output representation of application layer protocol data of interactions of a user with the plurality of network applications The learning services 1112 may include an interaction classifier 1304. The interaction classifier 1304 may classify the interactions received from each client application into one or more tasks. Each task of the one or more tasks can include multiple interactions across one or more network applications of one or more second servers of a second entity, such as servers of vendors of the network applications.

Different user interactions may exist in relation to different network applications. Moreover, different network applications may have associated with them novel or rare user interactions. For example, a dictation/text-to-speech application may have an associated sound input or sound output while a data processing application may have an associated keyboard input for receiving mathematical inputs and may have an graphical screen display objects for generating graphical chart outputs. Thus the different user interactions may be categorically different from one another. Different user interactions may also be categorically similar to one another. For example, data entry in a word processing application may be a user interaction categorically similar to data entry in a spreadsheet application.

As used herein tasks can, in some embodiments, refer to a categorical grouping of related user interactions. In addition, user interactions that initially appear similar may actually be categorically different tasks. For example, button clicks in a workflow of a first computer gaming network application may be a categorical task that is different from button clicks in a workflow of an email network application.

A task may be a collection of interactions performed on or by a client device to complete operation of a workflow. One example task may include filling out a form. Another example task may include inputting a username and password in fields of a network application. A task may also include, for example, creating a calendar invitation responsive to receiving an email in an email-based network application. Other example tasks may be referenced or discussed elsewhere herein.

Moreover, tasks may have a start and an end. For example, a task may include the popping up of a window, the user interaction with the window, and the user confirmation of the completion of the user interaction with the window. A task may begin with the display of an error message indicating a required field has not been filled in a form displayed on a screen. The task may continue with data entry by a user into the required field. The task may conclude with the user clicking a save or submit button to direct the saving of the data entered into the form. Because many different tasks are contemplated and untold new tasks conceivable, as well as many different user interactions are contemplated and untold new user interactions conceivable, tasks and user interactions may be provided in a database table. In further instances, tasks may be determined by machine learning algorithms as user interactions are monitored over time and categorized by machine learning processes, or in provided database tables.

The learning services 1112 includes an interaction aggregator 1206. The interaction aggregator 1306 operates to compile classified interactions (e.g., interactions grouped into a common task) together from the multiple interactions across the one or more network applications and provide the aggregated classified interactions to a task categorization manager 1308. For instance, many users may utilize a network application. Similarly, a user may utilize many network applications. Emergent behavior patterns are discernable in aggregated data of many interactions. Interactions may be aggregated into tasks based on the operative objective of an type of interaction (e.g., saving a document, closing an application, creating a Boolean search command, etc.). Interactions may be aggregated into tasks based on the nature of the interaction (e.g., keyboard selection of spelling and grammar checking functions to provide data entry may be a same task, while keyboard typing to provide gameplay commands for a computer game may be a different task). The interactions may also be aggregated into tasks based on characteristics of the interaction (e.g., mouse click interactions with an internet browsing application may all be a different task than mouse scroll wheel interactions with an internet browsing application). The interaction aggregator 1306 groups interactions into a common task based on the identity of the network application that the user is interacting with (e.g., off-target mouse clicks during a computer game are typical and ignored, whereas off-target mouse clicks that during the completion of a form may be grouped into a common task, such as a task related to clicking small radio buttons in the form to enter data). The interaction aggregator 1306 may group interactions into a common task based on the nature of the interaction across many applications, for instance, typing interactions may be grouped into a common task across many applications, such as a task related to accurate keyboarding.

The learning services 1112 includes a task categorization manager 1308. In view of the aggregation of many user interactions, the task categorization manager 1308 may provide a database of the aggregated classified interactions sorted into the one or more tasks. The aggregated classified interactions may provide data representative of trends associated with user interactions. For example, aggregated classified interactions may demonstrate that many users click in a wrong location adjacent to a screen display object but missing the screen display object. While a single misdirected click may be mere inadvertence, a pattern may emerge suggesting that additional training is needed for some or all users related to the proper clicking on the proper location.

In various embodiments, at least one task of the one or more tasks is defined by a plurality of interactions across a plurality of network applications. For instance, a task, such as typing common words may be defined by a plurality of interactions, such as typing the relevant words in different applications, such as word processors, email software, spreadsheet software, and accounting software. The plurality of interactions may extend across a plurality of network applications. Emergent patterns may be identified based on the plurality of interactions on different network applications. The patterns may suggest that algorithmic changes are needed for some or all users—regardless of which network applications a user implements. For instance, a plurality of interactions may reveal that the proper use of a machine-human interface requires training for some or all users, based on aggregate user experiences with completion of tasks.

The learning services 1112 may include a task selector 1310. The task selector 1310 may select, for a first task of the one or more tasks, from the interactions classified into the first task, a subset of interactions to be included in a training content comprising a recorded example of performing the first task across the one or more network applications. The task selector 1310 may provide the recorded example to a recorded example manager 1312. The recorded example manager 1312 may include a database of the recorded examples. For instance, many interactions may be classified into the first task and stored by a task categorization manager 1308. Of these interactions, various interactions may be associated with best cases. For example, a highly efficient workflow may involve interacting with different screen display objects in a particular sequence. A recorded example manager 1312 may store highly efficient workflows such as for later rendering to users.

Moreover, recorded examples of the recorded example manager 1312 may be large files or computationally intensive to render as moving images. Correspondingly, in various embodiments, the interactions recorded by the client applications may include an output to the Document Object Model rendered by the embedded browser. In this manner, data representative of user interactions may be more efficiently provided by representing the user interactions with an output to a Document Object Model rather than representing the user interactions with the recording and playback of the displayed pixels of the screen and the user interaction with each such pixel, etc. This may improve the speed of processing and reduce network bandwidth consumed, improving the operation of a computer network.

The learning services 1112 may include a training content generator 1314. For example, the training content generator 1314 may generate the training content configured to be transmitted to client applications responsive to receiving a request related to the first task by a task request receiver 1316. A task request receiver 1316 may receive, from a user or from another aspect of a system, such as an embedded browser, a request for training content. For instance, a user may interact with a client application to provide a request for training content connected with a task that the user is trying to complete. The user may click a button in the client application 404 (FIG. 11), such as in an embedded browser 410 (FIG. 11) of the client application 404 (FIG. 11). Alternatively, an aspect of the system, such as an embedded browser 410 (FIG. 11) in communication with a learning services 1112 (FIG. 11) may interoperate to automatically transmit to the task request receiver 1316, a request for training content. The task request receiver 1316 may trigger the training content generator 1314 which generates training content for display to the user.

The training content may relate to the mentioned task that the user is trying to complete. Because interactions can be classified into tasks, a data set of many interactions all associated with a given task is available to the system, such as in the task categorization manager 1308. Thus, the training content generator 1314 may access the task categorization manager 1308 and determine the task associated with the instant user interaction by comparing the instant user interaction to the data set of many interactions associated with the given task. The training content generator 1314 may query the recorded example manager 1312 and retrieve one or more recorded examples of the identified task as a training content package. The training content generator 1314 may also query the recorded example manager 1312 and retrieve multiple recorded examples of different identified tasks and generate a new, customized recorded example as a training content package. For example, a task may have multiple different interactions associated with a particular sequence (e.g., the "critical path"). The training content generator 1314 may generate training content associated with the execution of the critical path. Consequently, recorded examples from the recorded example manager 1312 and/or tasks from the task categorization manager 1308 may be retrieved and, in some embodiments, via machine learning, training content related in part to a plurality of recorded examples and/or tasks may be assembled into a unique training content package.

In some embodiments, the learning services 1112 can receive feedback on one or more training content the learning services provides to one or more client applications. In some embodiments, the learning services 1112 can receive feedback relating to a first training content package and in response to the feedback, generate a second generated content package responsive to determining that the feedback relating to the first training content package sat In some embodiments, the learning service gateway 1112 can receive feedback relating to a first training content package and in response to the feedback satisfying a predetermined threshold, can generate a second training content package that is different from the first training content package based on the received feedback.

For example, a user may provide feedback to a feedback receiver 1324 of the learning service gateway 1112 via the embedded browser 410 and/or client application 404. In some embodiments, the feedback receiver 1324 or the client application 404 can provide an interface for presentation on the client device to prompt a user to provide feedback on a given training content. The client application can be configured to provide an actionable object, which when interacted with, enables a user to provide feedback. The feedback can be in the form of a numerical score between 0-10; 1-5; or any other scale. In some embodiments, the feedback can be in the form of a response to a question "was this training content helpful?". The feedback receiver 1324 may log received feedback relating to the first training content package over time. The feedback receiver 1324 may assign a score to the feedback that corresponds to the priority of addressing the feedback. The feedback receiver 1324 may also assign a score to the feedback that corresponds to the number of users providing the same or similar feedback. For instance, the feedback receiver 1324 may tally votes from users regarding satisfaction with features and/or the feedback receiver 1324 may scan user narrative feedback for key words.

The feedback receiver 1324 may compare the score, tally and/or key words to a pre-established threshold. The pre-established threshold can be used to provide an indication to the feedback receiver 1324 of a need to change the first training content package to impel changes to the feedback being received. The pre-established threshold can be used to provide an indication to the feedback receiver 1324 of a potential improvement to the first training content package. In response to the determining that the feedback relating to the first training content package satisfies the predetermined threshold, a second training content package is generated by the one or more first servers on which the learning service 1112 is executing, and specifically, is generated by the training content generator 1314.

The feedback receiver 1324 interoperates with the training content generator 1314 to incorporate the feedback to modify the training content package, such as by accessing different tasks from the task categorization manager 1308 or different recorded interactions from the recorded example manager 1312 so as to prepare the second training content package with different data than the first training content package. In various instances, the feedback receiver 1324 interoperates with a screen display object to receive feedback from a user. For example, in response to a feedback indicating lingering confusion subsequent to provision of a training content package, the training content package may be modified. In response to feedback from many users indicative of lingering confusion subsequent to provision of a training content package, the training content package may be retired from use. For instance, in response to a feedback indicating a score, tally and/or key word(s) reaching a pre-established threshold, the training content generator 1314, at the direction of the feedback receiver 1324, may provide different tasks from the task categorization manager 1308 and/or different recorded interactions from the recorded example manager 1312. The training content generator 1314 may generate a second training content package with data corresponding to the different tasks and/or different recorded interactions, for provision to a user in a second training content package.

The learning services 1112 may include a baseline identifier 1318. The one or more first servers on which the learning service 1112 is executing may be further configured to identify, based on the received interactions (for example, those received from a user and/or those stored by the recorded example manager 1312), a baseline identifying an amount of time for completing a certain task. For example, among an aggregate set of many user interactions associated with a particular task by the task categorization manager 1308, there may be different elapsed times associated with the different user interactions and/or different tasks. For instance, the embedded browser 410 may time user interactions and/or tasks and provide an elapsed time associated with a user interaction and/or a task to the baseline identifier 1318.

In various embodiments, the state tracker 1210 and/or recording module 1208 of the learning services agent (FIG. 12) are configured to time different user interactions and/or different tasks and transmit this timing to the learning services 1112. In further embodiments, the expert user identifier 1320 times user interactions and/or tasks, as mentioned herein below. An analysis of these times may be performed by the baseline identifier 1318 to determine the expected time to complete the task(s) by a user. For instance, a mean, a median, a mode, a distribution about a given deviation, a weighting function, and/or other analytic tools may provide for a time associated with a completion of the task by a certain percentage of users. By identifying a baseline time by the baseline identifier 1318, the training content generator 1314 may generate training content packages related to the improvement of user speed and/or may determine aspects of machine operation, such as screen object display size and arrangement, needing further changes. Furthermore, one or more of the interactions may identify a network application, a time stamp and an action performed by a user of the client application that recorded the interaction.

The learning services 1112 may include an expert user identifier 1320. For example, the expert user identifier 1320 may identify, by the one or more first servers on which the learning services 1112 is executing, based on the received interactions, a subset of users associated with the plurality of client applications. Each user of the identified subset of users can complete the task within a predetermined amount of time. For instance, the expert user identifier 1320 may analyze recorded interactions of the recorded example manager 1312 and/or aggregated classified interactions of the task categorization manager 1308. As used herein, analyzing may include determining an elapsed time associated with completion by the user of an interaction or a task. The analyzing may include determining a count of attempts to by the user to achieve completion of an interaction or task. In response to the analyzing, the expert user identifier 1320 may isolate a subset of classified interactions within a set associated with a task that evidence particularized user competence. For instance, an elapsed time to completion of an interaction or task may be below a threshold, suggesting a level of competence of the user with the interaction or task. Similarly, a count of attempts by the user to complete an interaction or task may be below a threshold, suggesting a level of competence of the user with the interaction or task. Any other metric associated with particularized user competence may be contemplated. In various instances, the threshold may be changed by the expert user identifier 1320 based on the recorded interactions and/or aggregated classified interactions. For instance, the expert user identifier 1320 may set the threshold at a $90^{th}$ percentile of all users. For example, the fastest 10 percent of users, or the most accurate 10 percent of users, may be expert users with particularized user competence.

The learning services 1112 may include a content sanitizer 1322. The content sanitizer 1322 may remove content from data making up the generated training content prior to transmitting the generated training content. For instance, recorded examples and/or previously performed interactions of tasks may be assembled into a training content package, as mentioned.

However, at least a portion of data making up the generated training content might contain sensitive information about users, devices, received inputs, and/or the like. For instance, if the recording records screenshots in which confidential or sensitive information is being displayed, the content sanitizer can be configured to identify the sensitive information and remove or obscure the information as part of generating the training content. The sensitive information may be removed from the data prior to the data being assembled into a training content package. The removal of the data corresponding to the sensitive information may be termed, "sanitizing the generated training content." While in various embodiments, the data is removed prior to generation of a training content package, in further instances, a training content package is generated, then sanitized. In one example, sensitive user information may be associated with a recorded example and/or task. For instance, a user interaction may include typing of personally identifying information. The training content package may be generated relating to the user interaction including typing, however, the contents of the typing (personally identifying information) may be removed. Thus, the generated training content is sanitized.

The content sanitizer 1322 implements rules and/or machine learning to identify content to be removed so that the generated training content making up a training content package does not contain the removed content. For example, a table of words or phrases corresponding to removable content may comprise a rule. Further rules may include identification of a flag associated with a field in a form that a user interaction is affecting, for instance, an "address" field. The generated training content may be prepared with the actual address removed. A further example may include an analysis of a sequence of user interactions making up a task. For instance, clicking a "purchase" button prior to entering a 16 digit string of numerals indicates that the numerals are a credit card number, whereas activating a calculator prior to entering a 16 digit string of numerals does not indicate that the numerals are content to be removed.

The learning services 1112 may include a feedback receiver 1324. For example, wherein the training content package is a first training content package, the learning services 1112 may receive feedback relating to the first training content package. Thereafter, the training content generator 1314 may generate, by the one or more first servers, a second generated content package responsive to determining that the feedback relating to the first training content package satisfies a predetermined threshold. As previously explained, feedback may include a score or other numerical rating of the perceived effectiveness of the training content package that a user submits. A predetermined threshold may be an average score across multiple users or another metric, also as previously explained.

The learning services 1112 may include a user session length comparator 1326 that interacts with the expert user identifier 1320. For example, the user session length comparator 1326 may receive, by the one or more first servers on which the learning services 1112 is executing, an indication from a second client application executing on a second client device, that a user session is taking more time than a baseline amount of time to complete the first task. For instance, a second client application executing on a second client device may be associated with a user who is attempting to use a client application. The learning services 1112 may determine that training content related to the first task be provided to the second client device based on the user session taking more than a baseline amount of time to complete the first task. Thereafter, the training content generator 1314 may transmit, by the one or more first servers on which the learning services 1112 is executing, the generated content package responsive to receiving the indication. Briefly, a user may be taking abnormally long to complete a task relative to the baseline identified by the baseline identifier 1318. The user session length comparator 1326 may compare the elapsed time of the user interaction(s) associated with the task to the baseline and in response to exceeding the baseline, may trigger the training content generator 1314 to provide a training content package to the second client device.

Figure 14:
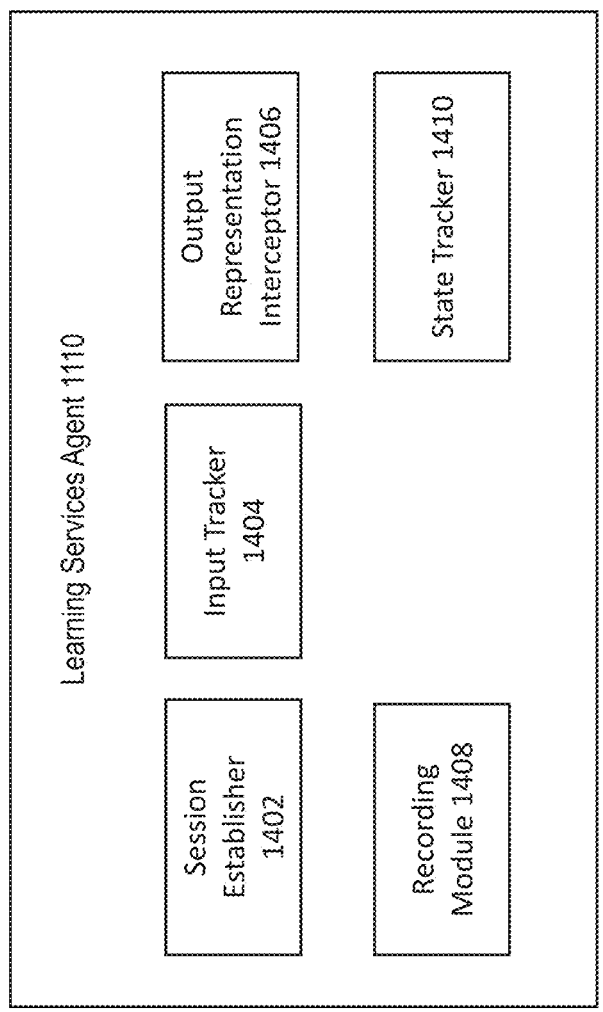
FIG. 14 is a flowchart of an example method for generating training content for completion of tasks.

Referring to FIG. 14, depicted is a flow diagram of one embodiment of a method 1400 for generating training content for completion of tasks. The functionalities of the method may be implemented using, or performed by, the components detailed herein in connection with FIGS. 1-13 and 15. In brief overview, a first server of a first entity may receive interactions recorded by a client application (1405). The first server may classify the interactions into tasks (1410). The first server may select a task (1415). The first server may also generate training content related to the task (1420). The first server may receive the feedback pertaining to the training content (1425) and update the training content based on the feedback.

Referring now to operation (1405), and in some embodiments, the method includes receiving, by one or more first servers of a first entity, from each client application of a plurality of client applications executing on respective client devices, interactions recorded by the client application via an embedded browser of the client application. The first servers of the first entity may include the servers that the learning service 1112 is running on. For example, the first servers may be network devices 432 on which cloud services 408 (FIG. 11) are running. The learning services 1112 may include an interaction receiver 1302 (FIG. 13) that receives the interactions. In various embodiments, the embedded browser is integrated into the client application. The interactions recorded by the client applications may include an output to the Document Object Model rendered by the embedded browser. The client application may intercept output representation of application layer protocol data of interactions of a user with the plurality of network applications. The output representation can be outputted to a document object model for rendering by the embedded browser.

Referring now to operation (1410), and in some embodiments, the method includes classifying, by the one or more first servers, the interactions received from each client application into one or more tasks. Each task of the one or more tasks may include multiple interactions across one or more network applications of one or more second servers of a second entity. One or more of the interactions may identify a network application, a time stamp and an action performed by a user of the client application that recorded the interaction. The interaction classifier 1304 (FIG. 13) may classify the received interactions. For example, data entry in a word processing application may be a user interaction categorically similar to data entry in a spreadsheet application. As used herein "tasks" can, in some embodiments, refer to a categorical grouping of related user interactions. In addition, user interactions that initially appear similar may actually be categorically different tasks. For example, button clicks in a workflow of a first computer gaming network application may be a categorical task that is different from button clicks in a workflow of an email network application. Moreover, tasks may have a start and an end. For example, a task may include the popping up of a window, the user interaction with the window, and the user confirmation of the completion of the user interaction with the window. The concept of a workflow may be a helpful tool for characterizing the nature of a task.

In some embodiments, at least one task of the one or more tasks is defined by a plurality of interactions across a plurality of network applications. In other embodiments, at least one task of the one or more tasks is defined by a plurality of interactions with one network applications. Moreover, in various embodiments, the one or more first servers identify, based on the received interactions, a baseline identifying an amount of time for completing the task. The baseline may be used to determine which users are particularly efficient and whose interactions associated with task completion may be incorporated into a training content package. The baseline also may be used for other determinations as discussed herein above.

Similarly, the method may include identifying, by the one or more first servers, based on the received interactions, a subset of users associated with the plurality of client applications, each user of the identified subset of users completing the task within a predetermined amount of time. Once again, this subset of users may be flagged as having particularized user competence and whose interactions may be incorporated into a training content package.

Referring now to operation (1415), and in some embodiments, the method includes selecting, by the one or more first servers, for a first task of the one or more tasks, from the interactions classified into the first task, a subset of interactions to be included in a training content comprising a recorded example of performing the first task across the one or more network application. In various instances, the method further comprises removing content from the subset of interactions prior to transmitting the generated training content.

The subset of interactions may include those of one or more subset of users identified by the expert user identifier 1320 (FIG. 13) as experts. The identified subset of users can complete the task associated with the subset of interactions within a predetermined amount of time. For instance determining an elapsed time or attempt count associated with completion by the user of an interaction or a task is one way to determine which subset of interactions to include in training content.

The removing of content may be performed by the content sanitizer 1322 (FIG. 13). For instance, recorded examples and/or tasks may be assembled into a training content package, as mentioned. However, at least a portion of data making up the generated training content might contain sensitive information about users, devices, received inputs, and/or the like. In various embodiments, the data is removed prior to generation of a training content package. In some embodiments, a training content package is generated and then sanitized.

Finally, referring now to operation (1420), and in some embodiments, the method includes generating, by the one or more first servers, the training content configured to be transmitted to client applications responsive to receiving a request related to the first task. For instance, a user seeking to accomplish a first task via a client application may transmit a request for training content, such as via clicking a button within an embedded browser session. Similarly, the embedded browser and/or client application may provide a request for training content, such as because a user is exceeding a threshold amount of time in completing a first task. One may appreciate that the pre-established threshold mentioned above with respect to determine that a feedback indicates a score, tally and/or key word(s) reaching a pre-established threshold may be triggered by the clicking by the user of a screen display object with a clickable button.

The training content may relate to the mentioned interaction that the user is trying to complete. Because interactions can be classified into tasks, a data set of many interactions all associated with a given task is available to the system. A training content generator may access the task categorization manager and determine the task associated with the instant user interaction by comparing the instant user interaction to the data set of many interactions associated with the given task. The training content generator may query the recorded example manager and retrieve one or more recorded examples of the identified task as a training content package. The training content generator may also query the recorded example manager and retrieve multiple recorded examples of different identified tasks and generate a new, customized recorded example as a training content package.

Referring now to operation (1425), feedback may be received pertaining to the training content. For instance, the method may include receiving, by the one or more first servers, feedback relating to the first training content package; and generating, by the one or more first servers, a second generated content package responsive to determining that the feedback relating to the first training content package satisfies a predetermined threshold.

Moreover, in various instances, there may be received, by the one or more first servers, an indication from a second client application executing on a second client device, that a user session is taking more time than a baseline amount of time to complete the first task. Consequently, the method may also include transmitting, by the one or more first servers, the generated content package responsive to receiving the indication.

Figure 15:
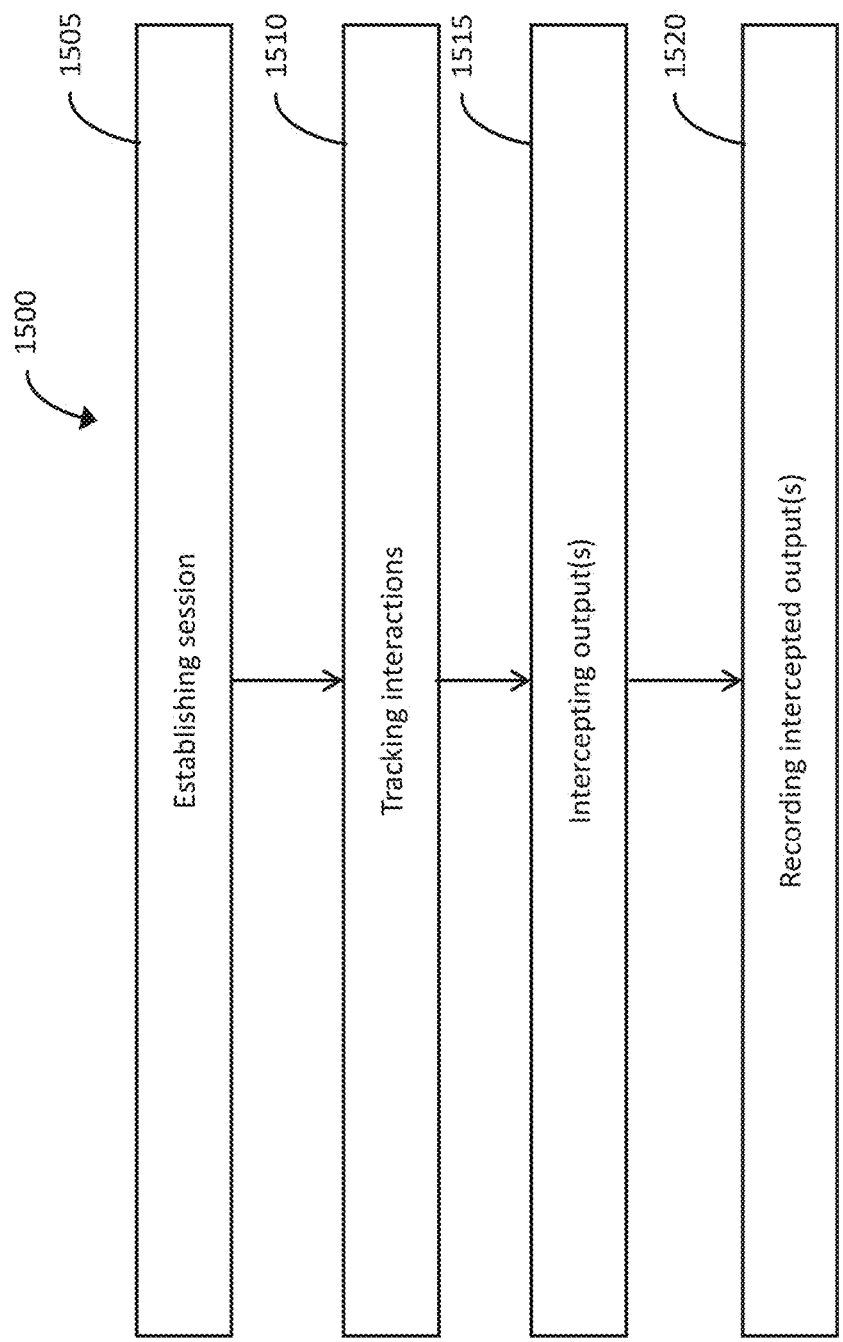
FIG. 15 is a flow chart of an example method for recording application level information of a user across a plurality of network application.

Referring to FIG. 15, depicted is a flow diagram of one embodiment of a method 1500 for recording application level information of a user across a plurality of network applications for generating training content for completion of tasks. The functionalities of the method may be implemented using, or performed by, the components detailed herein in connection with FIGS. 1-14. In brief overview, a client application may establish a session (1505). The client application may track interactions by the user (1510). The client application may intercept output(s) (1515). The client application may record intercepted output(s) (1520). The client application may then store recorded session (operation 1525) and/or provide to the interaction receiver.

Referring now to operation (1505) and in some embodiments, the method may include establishing, by a client application, one or more sessions of a user for a plurality of network applications established via an embedded browser within the client application. For example, a user may indicate a request to utilize a network application. Moreover, a user utilizing a network application may indicate a request to utilize learning services (e.g., training content) in connection with the network application. For instance, a user may click a button, or an embedded browser and/or network application may automatically request to utilize learning services. A session between the user (specifically, the client application having the embedded browser and accessing the network application at issue) and the learning services may be established by the learning services agent of the client application.

Referring now to operation (1510) and in some embodiments, the method may include tracking, by the client application, user input and pointer movement of interactions by the user. Moreover, the method may include tracking, by the client application, a state of the one or more sessions and the embedded browser. As a user clicks a mouse, types on a keyboard, interacts with a touch screen, stimulates a microphone, or otherwise interacts with a human-to-machine interface of the user device to provide inputs to (or receive outputs from) a network application, an input tracker also receives these interactions.

Referring now to operation (1515) and in some embodiments, the method may include intercepting, by the client application, output representation of application layer protocol data of interactions of the user with the plurality of network applications, the output representation outputted to a document object model for rendering by the embedded browser. Furthermore, the intercepting may include intercepting, by the embedded browser, at a point between decryption of content from a network stack of a client device and rendering on the display of the client device. For instance, the network application may provide human-readable content for provision to the user on a human-to-machine interface of the user device. An output representation interceptor also receives these outputs. The outputs may include data representing interactions of a user with network applications. The outputs may be received by the output representation interceptor because the output representation interceptor is positioned parallel to the network application and the user. In further instances, the outputs may be received by the output representation interceptor because the output representation interceptor is positioned interstitially between the network application and the user.

Referring now to operation (1520) and in some embodiments, the method may include recording, by the one or more client application, the intercepted output representation, the tracked user input and pointer movement, and/or the state to record the one or more sessions of the user. The recorded session may be stored and/or provided to the interaction receiver (operation 1525) such as for method 1400 for generating training content for completion of tasks (FIG. 14).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

The invention claimed is:

1. A method for generating training content for completion of tasks, the method comprising:
    receiving, by one or more first servers of a first entity, from each client application of a plurality of client applications executing on respective client devices, interactions performed by a user of the client application and captured by the client application via an embedded browser of the client application;
    classifying, by the one or more first servers, the interactions received from each client application into one or more tasks, each task of the one or more tasks including multiple interactions across one or more network applications of one or more second servers of a second entity for performing the task;
    selecting, by the one or more first servers, for a first task of the one or more tasks, from the interactions classified into the first task, a subset of interactions to be included in the training content for guiding users of the client applications to perform the first task by performing the subset of interactions;
    generating, by the one or more first servers, the training content including the subset of interactions; and
    transmitting, by the one or more first servers, the training content to one or more client applications of the plurality of client applications executing on the respective client devices, the one or more client applications configured to guide the users of the client applications to perform the first task using the training content.

2. The method of claim 1, wherein the embedded browser is integrated into the client application.

3. The method of claim 1, wherein at least one task of the one or more tasks is defined by a plurality of interactions across a plurality of network applications.

4. The method of claim 1, further comprising identifying, by the one or more first servers, based on the received interactions, a baseline identifying an amount of time for completing the task.

5. The method of claim 1, further comprising identifying, by the one or more first servers, based on the received interactions, a subset of users associated with the plurality of client applications, each user of the identified subset of users completing the task within a predetermined amount of time.

6. The method of claim 1, wherein one or more of the interactions identify a network application, a time stamp and an action performed by a user of the client application that captured the interaction.

7. The method of claim 1, further comprising removing content from the subset of interactions prior to transmitting the generated training content.

8. The method of claim 1, wherein the training content package is a first training content package, the method further comprising:
    receiving, by the one or more first servers, feedback relating to the first training content package; and
    generating, by the one or more first servers, a second generated content package responsive to determining that the feedback relating to the first training content package satisfies a predetermined threshold.

9. The method of claim 1, further comprising:
    receiving, by the one or more first servers, an indication from a second client application executing on a second client device, that a user session is taking more time than a baseline amount of time to complete the first task; and
    transmitting, by the one or more first servers, the generated content package responsive to receiving the indication.

10. The method of claim 1, wherein the interactions captured by the client applications include an output to the Document Object Model rendered by the embedded browser.

11. The method of claim 1, wherein the client application intercepts output representation of application layer protocol data of interactions of a user with the plurality of network applications, the output representation outputted to a document object model for rendering by the embedded browser.

12. The method of claim 1, wherein the interactions captured by the client application comprise interactions recorded by the client application, and wherein the training content comprises a recorded example of performing the first task.

13. A system for presenting additional content for a network application accessed via an embedded browser of a client application, the system comprising:
    one or more first servers of a first entity comprising a processor and memory, wherein the one or more first servers are configured to:
        receive, from each client application of a plurality of client applications executing on respective client devices, interactions performed by a user of the client application and captured by the client application via an embedded browser of the client application;
        classify the interactions received from each client application into one or more tasks, each task of the one or more tasks including multiple interactions across one or more network applications of one or more second servers of a second entity for performing the task;

select, for a first task of the one or more tasks, from the interactions classified into the first task, a subset of interactions to be included in the training content for guiding users of the client applications to perform the first task by performing the subset of interactions;

generate the training content including the subset of interactions; and transmit the training content to one or more client applications of the plurality of client applications executing on the respective client devices, the one or more client applications configured to guide the users of the client applications to perform the first task using the training content.

14. The system of claim 13, wherein the embedded browser is integrated into the client application.

15. The system of claim 13, wherein at least one task of the one or more tasks is defined by a plurality of interactions across a plurality of network applications.

16. The system of claim 13, wherein the one or more first servers are further configured to identify, based on the received interactions, a baseline identifying an amount of time for completing the task.

17. The system of claim 13, wherein one or more of the interactions identify a network application, a time stamp and an action performed by a user of the client application that captured the interaction.

18. The system of claim 13, wherein the training content package is a first training content package, and wherein the one or more first servers are further configured to:

receive feedback relating to the first training content package; and generate a second generated content package responsive to determining that the feedback relating to the first training content package satisfies a predetermined threshold.

19. The system of claim 13, wherein the interactions captured by the client application comprise interactions recorded by the client application, and wherein the training content comprises a recorded example of performing the first task.

\* \* \* \* \*